United States Patent
Nagano

(10) Patent No.: US 7,561,859 B2
(45) Date of Patent: Jul. 14, 2009

(54) WIRELESS COMMUNICATION TERMINAL, TRANSMISSION CONTROL METHOD, AND COMPUTER PROGRAM

(75) Inventor: Hajime Nagano, Sagamihara (JP)

(73) Assignee: Kyocera Corporation, Kyoto (JP)

( * ) Notice: Subject to any disclaimer, the term of this patent is extended or adjusted under 35 U.S.C. 154(b) by 478 days.

(21) Appl. No.: 11/536,511

(22) Filed: Sep. 28, 2006

(65) Prior Publication Data
US 2007/0083778 A1    Apr. 12, 2007

(30) Foreign Application Priority Data
Sep. 29, 2005    (JP)    ............................ P2005-283877

(51) Int. Cl.
*H04B 1/04*    (2006.01)
(52) U.S. Cl. ................. 455/127.1; 455/136; 455/67.11; 455/522
(58) Field of Classification Search ............... 455/127.2, 455/136, 522, 67.11, 550.1, 90.2, 91, 95, 455/130, 127.1
See application file for complete search history.

(56) References Cited
U.S. PATENT DOCUMENTS
5,129,098 A * 7/1992 McGirr et al. ................. 455/69
5,732,334 A * 3/1998 Miyake ....................... 455/126
5,774,797 A * 6/1998 Kawano et al. ........... 455/127.2
2003/0230733 A1* 12/2003 Tanaka ....................... 250/553

FOREIGN PATENT DOCUMENTS
| JP | 04-326211 | 11/1992 |
|---|---|---|
| JP | 09-214363 | 8/1997 |
| JP | 2002-271124 | 9/2002 |
| JP | 2003-309473 | 10/2003 |

* cited by examiner

*Primary Examiner*—Tony T Nguyen
(74) *Attorney, Agent, or Firm*—Hogan & Hartson LLP

(57) ABSTRACT

A wireless communication terminal includes a transmitting unit transmitting data to a wireless base station, a temperature detecting unit detecting a terminal temperature of the inside of the wireless communication terminal, a transmission power detecting unit detecting a transmission power, a memory unit storing plural sets of terminal temperature variation information, and a control unit changing the transmission power based on a state of communication with a wireless base station. The control unit selects and reads one of the plural sets of terminal temperature variation information from a memory unit, based on an ambient temperature, a transmission power, and a changed one of predetermined transmission powers. The control unit controls the transmission state of the data based on the selected one of the plural sets of terminal temperature variation information, so as to prevent the terminal temperature from increasing over an upper limit of a predetermined operation guarantee temperature range.

15 Claims, 26 Drawing Sheets

FIG. 20

| DATA RATE (kbps) | DATA CHANNEL GAIN RELATIVE TO PILOT (dB) |
|---|---|
| 0 | $-\infty$ (DATA CHANNEL IS NOT TRANSMITTED) |
| 9.6 | DataOffsetNorm + DataOffset9k6 + 3.75 |
| 19.2 | DataOffsetNorm + DataOffset19k2 + 6.75 |
| 38.4 | DataOffsetNorm + DataOffset38k4 + 9.75 |
| 76.8 | DataOffsetNorm + DataOffset76k8 + 13.25 |
| 153.6 | DataOffsetNorm + DataOffset153k6 + 18.5 |

WIRELESS COMMUNICATION TERMINAL, TRANSMISSION CONTROL METHOD, AND COMPUTER PROGRAM

BACKGROUND OF THE INVENTION

1. Field of the Invention

The present invention generally relates to a wireless communication terminal, a transmission control method, and a computer program. More specifically, the present invention relates to a wireless communication terminal that is suitable for suppressing heat generation caused by a transmission power for wireless communication.

Priority is claimed on Japanese Patent Application No. 2005-283877, filed Sep. 29, 2005, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A card-type wireless communication terminal has been known. The card-type wireless communication terminal can be configured to be inserted into a card slot of a PC (Personal Computer). Some models of the card-type wireless communication terminal cause a large amount of heat generation in transmission operation. The card slot of PC allows the generated heat to reside therein, thereby increasing a temperature of the wireless communication terminal. The temperature increase of the wireless communication terminal can provide an influence to devices integrated in the wireless communication terminal, thereby shortening a life-time of the wireless communication terminal.

One of the issues to be solved in connection with the wireless communication terminal is how to realize an efficient heat radiation from he card slot. Another issues is how to suppress the heat generation. The card slot is configured to allow accumulation of the generated heat therein. Some conventional techniques for suppressing the heat generation of the wireless communication terminal have been proposed.

Japanese Unexamined Patent Application, First Publication, No. 2003-309473 discloses a first conventional technique for suppressing heat generation in the wireless communication terminal. FIG. 23 is a block diagram illustrating a typical example of the conventional inter configuration of the wireless communication terminal. FIG. 24 is a diagram illustrating examples of variations of temperature and transmission power of the conventional wireless communication terminal. A timer is started to count during a continuous transmission with the normal power. When the counted value reaches a predetermined value, the transmission power is attenuated, while continuing the transmission and monitoring a temperature sensor. When the temperature becomes higher than the threshold as upper limit of a predetermined allowable temperature range, the transmission power supply is terminated to suppress any further heat generation.

The first conventional technique allows a temperature rising over the threshold as upper limit of the allowable temperature range while continuing the transmission with the normal power.

Japanese Unexamined Patent Application, First Publication, No. 2002-271124 discloses a second conventional technique for suppressing heat generation in the wireless communication terminal. FIG. 25 is a diagram illustrating examples of variations of temperature and transmission power of the conventional wireless communication terminal. When the temperature becomes higher than the threshold as upper limit of a predetermined allowable temperature range, the transmission power is reduced to decrease the temperature. When the temperature becomes lower than the threshold as upper limit of the predetermined allowable temperature range, the transmission power is increased to recovery of the original transmission power.

The second conventional technique suppresses the transmission power once after the temperature has risen over the threshold as upper limit of the allowable temperature range. Namely, it is difficult for the second conventional technique to always control the temperature within the allowable temperature range.

Japanese Unexamined Patent Application, First Publication, No. 4-326211 discloses a third conventional technique for suppressing beat generation in e wireless communication terminal. FIG. 26 is a diagram illustrating examples of variations of temperature and transmission power of tie conventional wireless communication terminal. When an output from a temperature detecting unit having a temperature sensor becomes beyond a predetermined lower reference value Tu, then a transmission time period is limited to terminate the transmission after a predetermined time has lapsed. If the temperature is further risen and becomes higher than a predetermined higher reference value TH, then the transmission is inhibited to suppress any further heat generation.

The third conventional technique suppresses the transmission power once after the temperature has risen over the threshold as upper limit of the allowable temperature range. Namely, it is difficult for the third conventional technique to always control the temperature within the allowable temperature range.

Japanese Unexamined Patent Application, First Publication, No-9-214363 discloses a fourth conventional technique for suppressing heat generation in the wireless communication terminal. FIG. 27 is a block diagram illustrating a typical example of the conventional internal configuration of the wireless communication terminal. FIG. 28 is a diagram illustrating examples of variations of temperature and transmission power of the conventional wireless communication terminal. A limited period of time is set based on the transmission output mode or the transmission power. When a continuous transmission time becomes beyond the limited time period, the transmission is discontinued in a predetermined period of time in order to prevent a further heat generation. Otherwise, the transmission is continued while reducing the transmission power in order to reduce the heat generation.

The fourth conventional technique does not measure the temperature of the terminal. When an ambient temperature is lower than the ordinary temperature, the transmission power can, in a case, be reduced unnecessarily. When the ambient temperature is higher than the ordinary temperature, reducing the transmission power can, in a case, be insufficient because it is difficult for the fourth conventional technique to determine whether or not the transmission power should be reduced largely as compared to the normal case at the ordinary temperature. Even if the transmission power has been reduced, it is difficult for the fourth conventional technique to detect the magnitude of the temperature drop. It is thus difficult for the fourth conventional technique to determine whether or not the magnitude of the temperature drop is appropriate.

The above-described first, second, third and fourth conventional techniques allow the temperature rising over the threshold as upper limit of the allowable temperature range during the transmission operation of the terminal.

In view of the above, it will be apparent to those skilled in the art from this disclosure that there exists a need for an improved apparatus and/or method. This invention addresses this need in the art as well as other needs, which will become apparent to those skilled in the art from this disclosure.

SUMMARY OF THE INVENTION

Accordingly, it is a primary object of the present invention to provide a wireless communication terminal that is suitable for controlling the temperature thereof in the allowable temperature range in which the terminal is ensured to exhibit predetermined functions and operations.

It is another object of the present invention to provide a transmission control method of a wireless communication terminal for controlling the temperature thereof in the allowable temperature range in which the terminal is ensured to exhibit predetermined functions and operations.

It is a further object of the present invention to provide a computer program to be executed to perform a transmission control method of a wireless communication terminal for controlling the temperature thereof in the allowable temperature range in which the terminal is ensured to exhibit predetermined functions and operations.

In accordance with a first aspect of the present invention, a wireless communication terminal includes a transmitting unit that transmits data to a wireless base station; a temperature detecting unit that detects a terminal temperature of the inside of the wireless communication terminal; a transmission power detecting unit that detects a transmission power; a memory unit; and a control unit. The memory unit stores plural sets of terminal temperature variation information. Each of the plural sets of terminal temperature variation information is related to a time-variation of the terminal temperature. The time-variation of the terminal temperature is defined wit reference to an ambient temperature that is calculated based on the terminal temperature detected by the temperature detecting unit. The time-variation of the terminal temperature is caused by changing a first one of predetermined plural transmission powers to a second one thereof different from the first one. The control unit changes the transmission power based on a state of communication with the wireless base station. The control unit selects and reads one of the plural sets of terminal temperature variation information from the memory unit, based on the ambient temperature, the transmission power detected by the transmission power detecting unit, and the second one of the predetermined plural transmission powers. The control unit controls the state of transmission of the data based on the selected one of the plural sets of terminal temperature variation information, so as to prevent the terminal temperature from increasing over an upper limit of a predetermined operation guarantee temperature range.

Preferably, the wireless communication terminal may further include a transmission data quantity calculating unit that calculates a capacity of the data, a transmission time calculating unit that calculates a transmission time based on the capacity of the data calculated by the transmission data quantity calculating unit, the transmission time being necessary for transmitting the data, a scheduling unit that prepares a set of schedule information that includes timings of at least one of starting and discontinuing the transmission of the data, and a transmission control unit that renders the transmitting unit transmit the data based on the set of schedule information prepared by the scheduling unit and on the transmission power changed by the control unit.

Preferably, the control unit calculates an operation guarantee time based on the read one of the plural sets of terminal temperature variation information. The operation guarantee time is a time until the terminal temperature reaches the upper limit of the predetermined operation guarantee temperature range. The scheduling unit compares the operation guarantee time calculated by the control unit with the transmission time calculated by the transmission time calculating unit. The scheduling unit divides the data into divided frames of data based on a constant data capacity if the transmission time calculated by the transmission time calculating unit is longer than the operation guarantee time calculated by the control unit. The scheduling unit prepares a set of schedule information that includes timings of starting respective transmissions of the divided frames of data.

Preferably, the scheduling unit may compare the operation guarantee tine calculated by the control unit with the transmission time calculated by the transmission time calculating unit. The scheduling unit calculates, based on the read one of the plural sets of terminal temperature variation information, a terminal temperature when the transmission time calculated by the transmission time calculating unit has lapsed, if the transmission time calculated by the transmission time calculating unit is shorter than the operation guarantee time calculated by the control unit.

Preferably, the scheduling unit may divide the data into divided frames of data based on a constant data capacity and prepares a set of schedule information that includes timings of starting respective transmissions of the divided frames of data, if a sum of the terminal temperature and an estimated temperature increase value, by which the terminal temperature will increase after the transmission is discontinued, exceeds the upper limit of the operation guarantee temperature range.

Preferably, the control unit may calculate the estimated temperature increase value, based on the terminal temperature that varies depending on the events that the transmitting unit starts and discontinues the transmission.

Preferably, the scheduling unit may calculate, based on the read one of the plural sets of terminal temperature variation information, a terminal temperature when the transmission time calculated by the transmission time calculating unit has lapsed.

Preferably, the scheduling unit may divide the data into divided frames of data based on a constant data capacity and prepares a set of schedule information that includes timings of starting respective transmissions of the divided frames of data, if a sum of the terminal temperature and the estimated temperature increase value calculated by the control unit exceeds the upper limit of the operation guarantee temperature range.

Preferably, the control unit may include an internal memory region that stores the terminal temperatures detected by the temperature detecting unit in the sequence of detection. The control unit may determine whether or not a constant state of the terminal temperature is present, based on the terminal temperatures stored in the internal memory region, if the terminal temperature detected by the temperature detecting unit increases. The control unit may select and read one of the plural sets of terminal temperature variation information from the memory unit, based on an ambient temperature calculated from the terminal temperature in the constant state, if the constant state of the terminal temperature is present.

Preferably, the control unit may select and read one of the plural sets of terminal temperature variation information from the memory unit, based on a different ambient temperature calculated from the terminal temperature before the transmission starts, if the constant state of the terminal temperature is absent. The control unit may calculate the operation guarantee time based on the read one of the plural sets of terminal temperature variation information.

Preferably, the scheduling unit may set the transmission discontinuing time to be one of a maximum time period in which no retransmission appears and a time until the terminal temperature decreases to a predetermined restart reference temperature, in order to prepare a set of schedule information that includes timings of sting respective transmissions of divided frames of data.

Preferably, if the transmission control unit receives an input of the set of schedule information that is prepared by setting the transmission discontinuing time to be the maximum time period in which no retransmission appears, then the transmission control unit renders a timer measure a lapsed time after the transmission control unit stops the transmission in accordance with the set of schedule information.

Preferably, the transmission control unit renders the transmitting unit restart the transmission when the lapsed time reaches the maximum time period in which no retransmission appears.

Preferably, the restart reference temperature may be a terminal temperature before the transmission starts.

Preferably, the control unit may calculate the restart reference temperature so as to maximize a ratio of the transmitting time when the transmitting unit transmits the divided frames of data to the transmission discontinuing time when the transmitting unit discontinues the transmission.

Preferably, the scheduling unit may set the transmission discontinuing tine to be a time until the terminal temperature decreases to the restart reference temperate calculated by the control unit.

Preferably, the control unit may calculate the terminal temperature based on a lapsed time after the transmission starts and the set of terminal temperature variation information.

Preferably, the control unit may calculate a difference between the terminal temperature as calculated and the terminal temperature detected by the temperature detecting unit.

Preferably, the control unit may render the scheduling unit prepare the set of schedule information if the calculated difference is not almost zero.

Preferably, the control unit may render the transmission control unit continue the transmission of data based on a value of flag previously stored if the wireless base station transmits instructions to increase the transmission power while transmitting the data in accordance with the set of schedule information.

Preferably, the control unit may render the transmission control unit continue the transmission of data in accordance with the set of schedule information if the flag is not to refer the instructions to increase the transmission power.

Preferably, the transmission control unit may discontinue a data traffic at the timing of discontinuing the transmission of data in accordance with the set of schedule information, if the traffic of the transmission of data includes the data traffic and a control traffic that maintains the communication with the wireless base station.

Preferably, the transmission control unit may transmit the data while decreasing a transmission rate to a predetermined value at the timing of discontinuing the transmission of the data in accordance with the set of schedule information if a plurality of transmission rates of data exists.

In accordance with a second aspect of the present invention, a method of controlling a transmission by a wireless communication terminal may include the following processes. A terminal temperature of the inside of the wireless communication terminal is detected. A transmission power is detected. Plural sets of terminal temperature variation information are stored in a memory unit. Each of the plural sets of terminal temperature variation information is related to a time-variation of the terminal temperature. The time-variation of the terminal temperature is defined with reference to an ambient temperature that is calculated based on the terminal temperature detected by the temperature detecting unit. The time-variation of the terminal temperature is caused by changing a first one of predetermined plural transmission powers to a second one thereof different from the first one. The transmission power is changed based on a state of communication with a wireless base station. One of the plural sets of terminal temperature variation information is selected and read from the memory unit, based on the ambient temperature, the transmission power detected by the transmission power detecting unit, and the second one of the predetermined plural transmission powers. The state of transmission of the data is controlled based on the selected one of the plural sets of terminal temperature variation information, so as to prevent the terminal temperature from increasing over an upper limit of a predetermined operation guarantee temperature range.

In accordance with a third aspect of the present invention, a computer program to be executed to cause a wireless communication terminal to perform a method of controlling a transmission. The method includes the following processes. A terminal temperature of the inside of the wireless communication terminal is detected. A transmission power is detected. Plural sets of terminal temperature variation information are stored in a memory unit. Each of the plural sets of terminal temperature variation information is related to a time variation of the terminal temperature. The time-variation of the terminal temperature is defined with reference to an ambient temperature that is calculated based on the terminal temperature detected by the temperature detecting unit. The time-variation of the terminal temperature is caused by changing a first one of predetermined plural transmission powers to a second one thereof different from the first one. The transmission power is changed based on a state of communication with a wireless base station. One of the plural sets of terminal temperature variation information is selected and read from the memory unit, based on the ambient temperature, the transmission power detected by the transmission power detecting unit, and the second one of the predetermined plural transmission powers. The state of transmission of the data is controlled based on the selected one of the plural sets of terminal temperature variation information, so as to prevent the terminal temperature from increasing over an upper limit of a predetermined operation guarantee temperature range.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure:

FIG. 20 is a diagram illustrating interrelationships between transmission rates and transmission powers in accordance with CDMA 1xEV-DO communication system. Reducing the data rate (Data Rate) reduces the gain of the transmission power in accordance with a third embodiment of the present invention;

DETAILED DESCRIPTION OF THE INVENTION

Selected embodiments of the present invention will now be described with reference to the drawings. It will be apparent to those skilled in the art from his disclosure that the following descriptions of the embodiments of the present invention are provided for illustration only and not for the purpose of limiting the invention as defined by the appended claims and their equivalents.

First Embodiment

Figure 1:
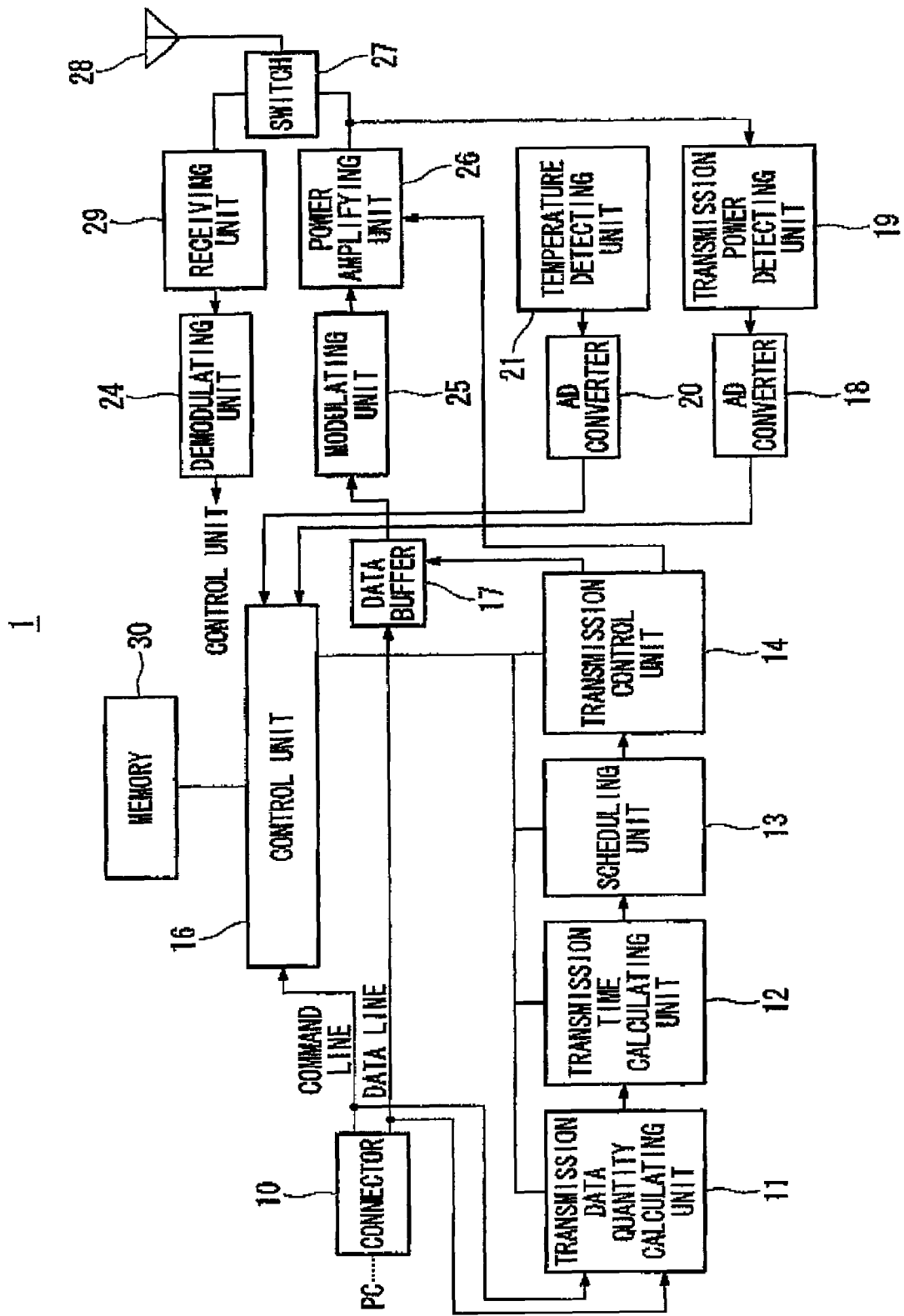
FIG. 1 is a schematic block diagram illustrating a wireless communication terminal in accordance with a first embodiment of the present invention.

FIG. 1 is a schematic block diagram illustrating a wireless communication terminal in accordance with a first embodiment of the present invention. A wireless communication terminal 1 can be, but is not limited to, a card wireless communication device that is inserted into a card slot of a PC (Personal Computer). The wireless communication terminal 1 may include an antenna 28 that is configured to transmit and/or receive a radio wave to or from a wireless base station. The wireless base station is not illustrated. The wireless communication terminal 1 may include a switch 27 that is configured to switch the transmission mode and the receiving mode as the operating mode of the wireless communication terminal 1. The switch 27 is connected to the antenna 28.

The wireless communication terminal 1 may include a receiving unit 29 and a power amplifying unit 26. The switch 27 is also connected to the receiving unit 29 and the power amplifying unit 26. When the switch 27 receives a radio signal from the antenna 28, then the switch 27 transmits the radio signal to the receiving unit 29. When the switch 27 receives an output from the power amplifying unit 26, then the switch 27 transmits the output to the antenna 28.

The receiving unit 29 is configured to receive a radio signal from the switch 27, wherein the radio signal has been transmitted from the antenna 28. The wireless communication terminal 1 may include a control unit 16. The wireless communication terminal 1 may include a demodulating unit 24 that is configured to receive the radio signal from the receiving unit 29 and demodulate the radio signal. Information included in the demodulated radio signal is transmitted to the control unit 16 so that the control unit refers the information.

The wireless communication terminal 1 may include a modulating unit 25 that is configured to modulate data to be transmitted from the wireless communication terminal 1. The wireless communication terminal 1 may include a power amplifying unit 26 that is configured to amplify the transmission power of the radio wave. The wireless communication terminal may include a temperature detecting unit 21 that has a temperature sensor that detects the temperature of the wireless communication terminal 1. The temperature detecting unit 21 converts the detected temperature into a voltage signal. The wireless communication terminal 1 may include first and second AD converters 18 and 20, and a transmission power detecting unit 19. The second AD converter 20 is configured to receive the output voltage from the temperature detecting unit 21 and to convert the output voltage into a digital signal. The second AD converter 20 transmits the digital signal to the control unit 16.

The transmission power detecting unit 19 is connected to a connection line between the power amplifying unit 26 and the switch 27 so that the transmission power detecting with 19 detects the current and the voltage on the connection line between the power amplifying unit 26 and the switch 27. The transmission power detecting unit 19 detects a transmission power from the detected current and voltage of the connection line. The transmission power detecting unit 19 converts the detected transmission power into a voltage signal for the transmission power. The first AD converter 18 is configured to receive the output voltage from the transmission power detecting unit 19 and convert the output voltage into a digital signal. The first AD converter 18 transmits the digital signal to the control unit 16.

The wireless communication terminal 1 may include a transmission data quantity calculating unit 11. The wireless communication terminal 1 may include a data buffer 17. The wireless communication terminal 1 may also include a connector 10 that can connect the wireless communication terminal 1 through a card slot to the PC. The connector 10 is connected to the controller 16 through a command line. The connector 10 is connected to the transmission data quantity calculating unit 11 through another command line. The connector 10 is connected to the transmission data quantity calculating unit 11 trough a data line. The connector 10 is connected to the data buffer 17 through another data line. Instructions or commends are entered from the PC so that the instructions or commends are transmitted from the connector 10 through the command lines to the controller 16 and the transmission data quantity calculating unit 11. Data is entered from the PC so that the data is transmitted from the connector 10 through the data lines to the data buffer 17 and the transmission data quantity calculating unit 11.

The wireless communication terminal 1 may include a transmission control unit 14. The data buffer 17 temporary stores the data that has been transmitted through the connector 10 from the PC. The data buffer 17 receives instructions from the transmission control unit 14 so that the data buffer 17 supplies the received data to the modulating unit 25 or divides the received data in frame to supply the framed data to the modulating unit 25.

The wireless communication terminal 1 may include a memory unit 30 that stores a temperature increase/decrease curve table 31. The memory unit 30 also stores an ambient temperature included in the temperature increase/decrease curve table 31. The memory unit 30 also stores terminal temperature variation information or a temperature increase/decrease curve that represents an increase and a decrease of the internal temperature of the wireless communication terminal 1. The temperature increase/decrease curve is defined by an original transmission power that has not yet been changed, and a changed transmission power. The ambient temperature is a temperature of the outside of the wireless communication terminal 1.

The control unit 16 calculates an operation guarantee time in which the proper operation is guaranteed. The operation guarantee time corresponds to a time of reaching the temperature to a threshold as upper limit of an operation guarantee temperature range or an allowable temperature range. The calculation is performed based on the instructions or commands entered through the connector 10 from the PC, the terminal temperature detected by the temperature detecting unit 21, the transmission power detected by the transmission power detecting unit 19, and the terminal temperature variation information stored by the memory unit 30.

The wireless communication terminal 1 may include a transmission time calculating unit 12, and a scheduling unit 13. The control unit 16 controls, based on the calculated operation guarantee time, operations of the transmission data quantity calculating unit 11, the transmission time calculating unit 12, the scheduling unit 13, and the transmission control unit 14 so that the terminal temperature is controlled within the operation guarantee temperature range.

The control unit 16 receives a transmission power request that has been transmitted from the wireless base station with reference to the state of wireless communication between the terminal 1 and the wireless base station. The control unit 16 reads out instructions that is included in the received transmission power request, wherein the instructions are either to increase or decrease the transmission power. If the instructions are to increase the transmission power, then the control unit 16 increases the transmission power by a predetermined level from the current transmission power level. If the instructions are to decrease the transmission power, then the control unit 16 decreases the transmission power by a predetermined level from the current transmission power level. The control unit 16 supplies the increased or decreased transmission power level to the transmission control unit 14. In accordance with the regulation of CDMA, die wireless communication state c be represented by a receiving level at which the wireless communication terminal as the mobile station receives the radio wave from the wireless base station. The wireless base station transmits the transmission power request to each mobile station so that the receiving level is maintained constant.

The predetermined level by which the current transmission power is increased or decreased can be determined by negotiation between the terminal and the wireless base station. In case of 1xEV-DO regulation, typical examples of the predetermined level may be 1 dB, 0.5 dB and 0.25 dB.

The transmission data quantity calculating unit 11 calculates a data capacity based on data entered through the connector 10. The transmission data quantity calculating unit 11 calculates a transmission time necessary for transmitting the data. The calculation is performed based on the calculated data capacity and a transmission rate available at the time when the calculation is performed.

The scheduling unit 13 generates schedule information for enabling the transmission control unit 14 to transmit data that are stored in the data buffer 17. The schedule information is information of when the data transmission is started if the data transmission is continuous. If the data is divided and divided frames of data are transmitted, then the schedule information includes when a transmission of each divided flame of data is started and terminated, and also includes a time interval between the adjacent transmissions of the divided frames of data.

The scheduling unit 13 compares the transmission time with the operation guarantee time, wherein the transmission time has been calculated by the transmission time calculating unit 12, and the operation guarantee time has been calculated by the control unit 16. The scheduling unit 13 determines, based on the comparison results, whether the data transmission should be performed without dividing the data or the data should be divided into a plurality of data frames to transmit the plurality of divided data frames. The scheduling unit 13 prepares the schedule information based on the determination result. The scheduling unit 13 supplies the schedule information to the transmission control unit 14 and the control unit 16.

The transmission control unit 14 receives the schedule information from the scheduling unit 13. The transmission control unit 14 renders, based on the schedule information, the data buffer 17 to supply the stored data to the modulating unit 25. The transmission control it 14 supplies the power amplifying unit 26 with the transmission power level that has been supplied by the control unit 16.

The control unit 16 the transmission data quantity calculating unit 11, the transmission time calculating unit 12, the scheduling unit 13, and the transmission control unit 14 can be realized by function units that are hardware and/or software constructed or programmed to carry out the functions. The wireless communication terminal 1 integrates a CPU (Central Processing Unit) and a memory. If the function units are realized by the software programs, the software program can be loaded to the integrated memory and the software program can be executed by the CPU.

Figure 2:
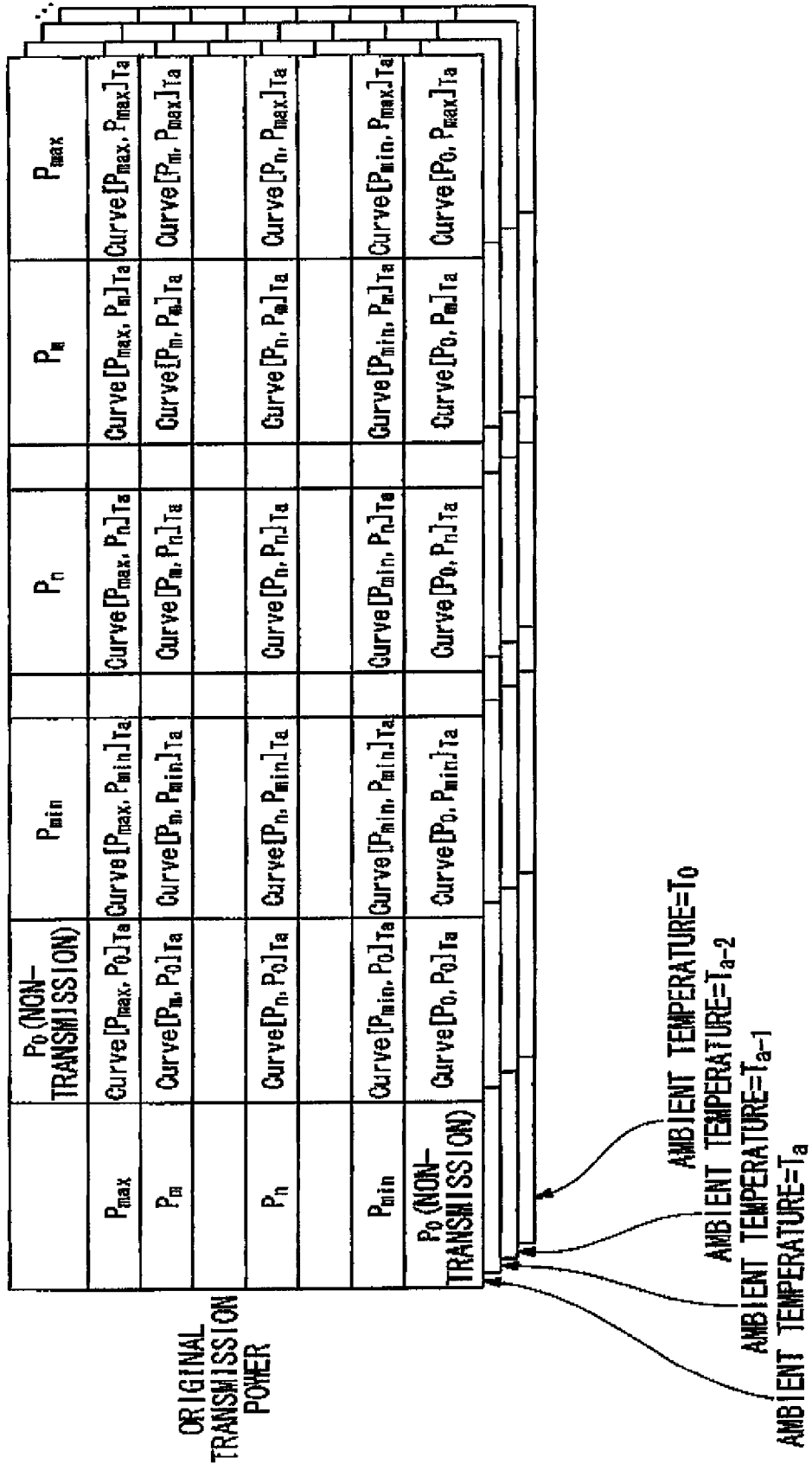
FIG. 2 is a view illustrating data structures of a temperature increase/decrease curve table stored in a memory of the wireless communication terminal shown in FIG. 1 in accordance with the first embodiment of the present invention.

FIG. 2 is a view illustrating data structures of a temperature increase/decrease curve table 31 stored in the memory 30 of the wireless communication terminal 1 shown in FIG. 1. The temperature increase/decrease curve table 31 includes a plurality of tables for different ambient temperatures (Ta, Ta-1, Ta-2, - - - , To) that are predetermined and different by a predetermined interval.

For example, the ambient temperatures can be set in the range of −20° C. to +80° C. with an interval of 10° C. "a" of "Ta" is 0 to 10. Eleven tables are set for eleven ambient temperatures. Each table includes the above-described terminal temperature variation information that corresponds to the original transmission power that has not yet been changed and the changed transmission power. In other words, each table includes a measured variation of the terminal temperature over time when the transmission power is changed. In FIG. 2, the terminal temperature variation information can be represented by Curve [Pn, Pm] at the ambient temperature $T_a$ where Pn is the original transmission power that has not yet been changed and Pm is the changed transmission power.

If the changed transmission power is higher than the original transmission power, then the terminal temperature variation information represents the tendency of increase of the terminal temperature, namely the temperature increasing curve. If the changed transmission power is lower than the original transmission power, then the terminal temperature variation information represents the tendency of decrease of the terminal temperature, namely the temperature decreasing curve.

Figure 3:
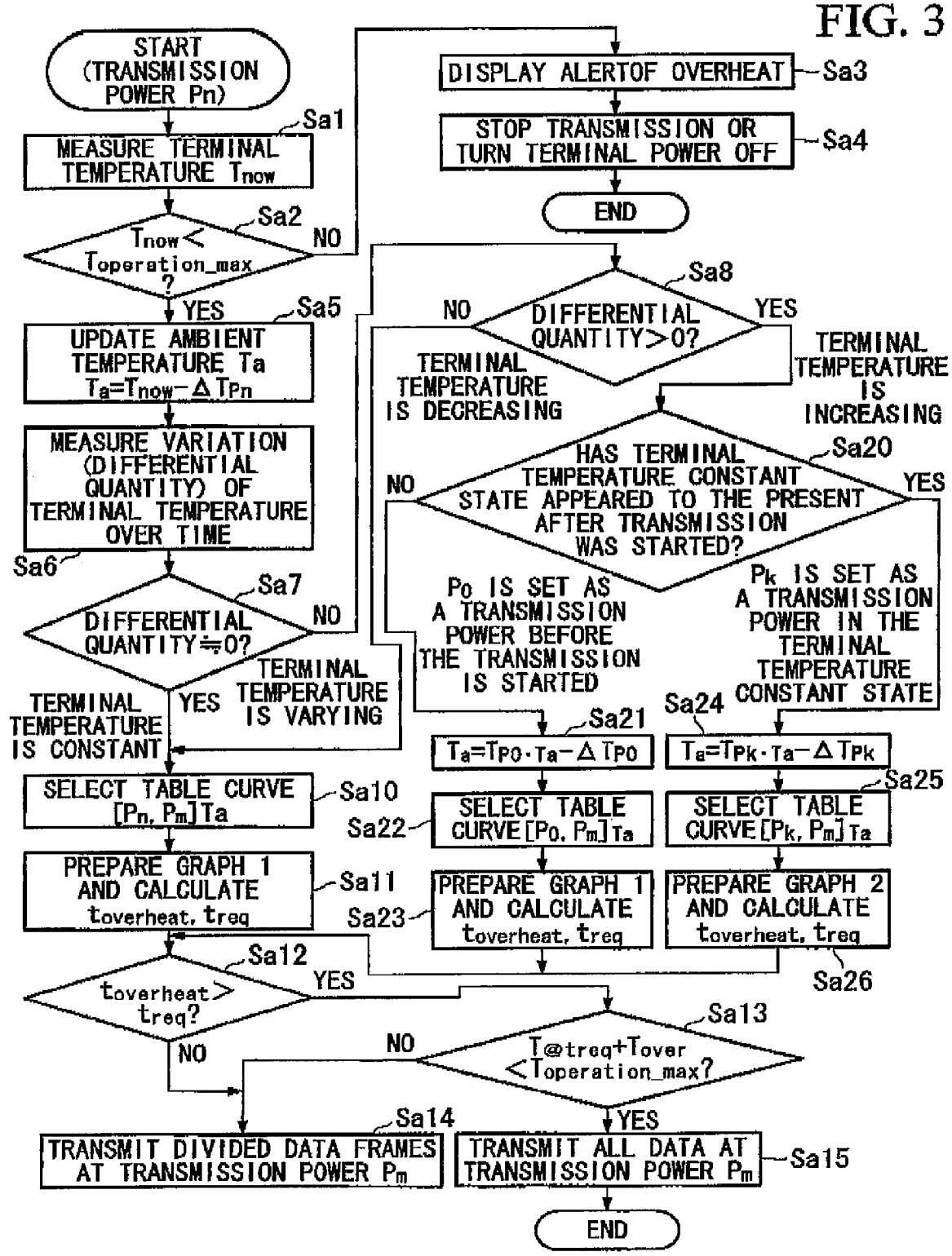
FIG. 3 is a flow chart illustrating transmission power control processes performed by the wireless communication terminal shown in FIG. 1 in accordance with the first embodiment of the present invention.
Figure 4A:
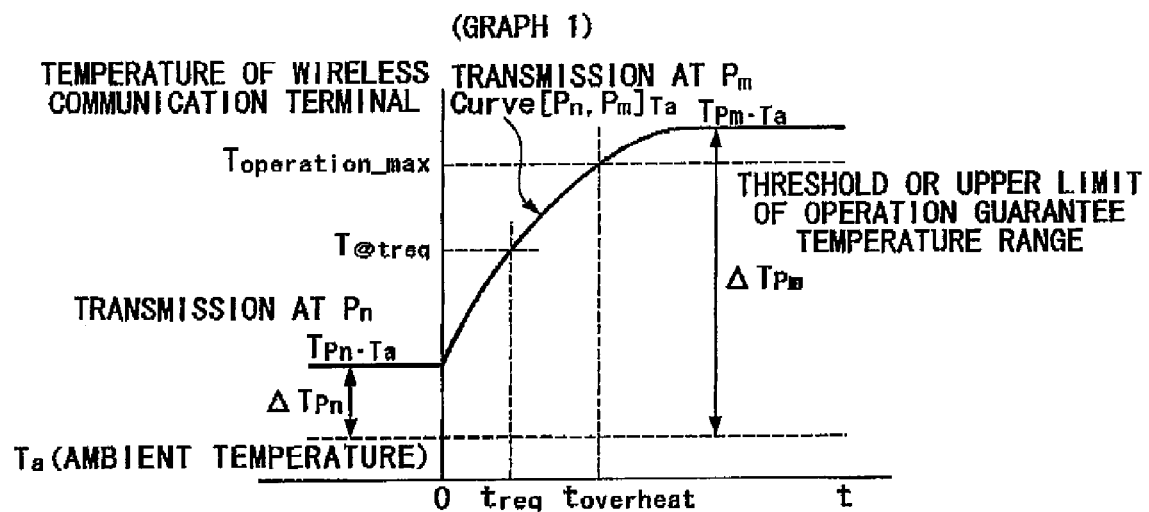
FIG. 4A is a diagram illustrating a graph 1 that is prepared from a terminal temperature variation formation Curve [Pn, Pm] in accordance with the first embodiment of the present invention.
Figure 4B:
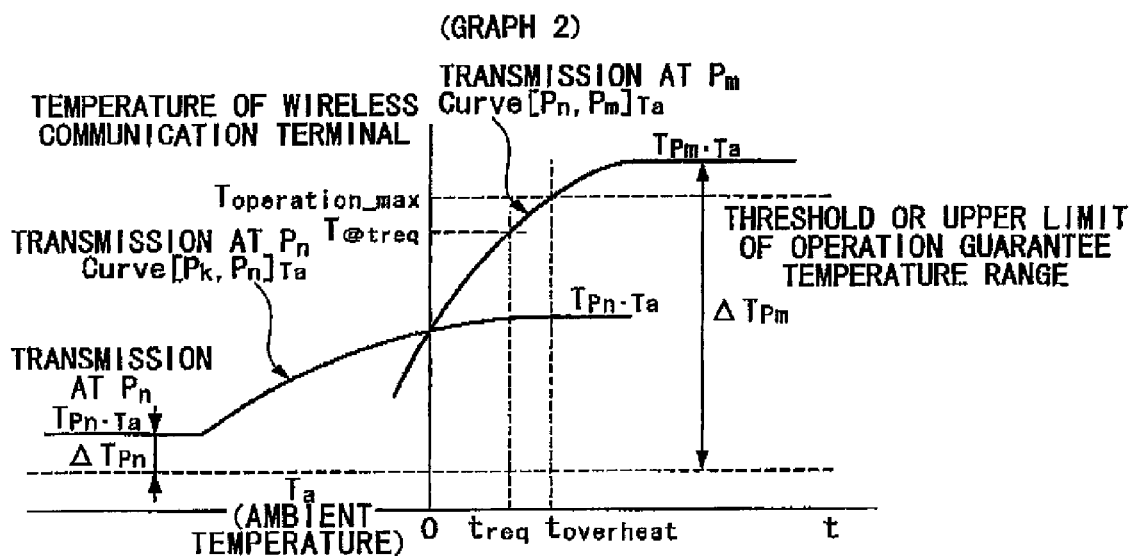
FIG. 4B is a diagram illustrating another graph 2 that is prepared from a terminal temperature variation formation Curve [Pn, Pm] in accordance with the first embodiment of the present invention.

FIG. 3 is a flow chart illustrating transmission power control processes performed by the wireless communication terminal 1 shown in FIG. 1. FIG. 4A is a diagram illustrating a graph 1 that is prepared from a terminal temperature variation formation Curve [Pn, Pm]. FIG. 4B is a diagram illustrating another graph 2 that is prepared from a terminal temperature variation formation Curve [Pn, Pm] Transmission power control processes performed by the wireless communication terminal 1 shown in FIG. 1 will be described with reference to FIG. 3.

In Step Sa1, the control unit 16 sets an input temperature to be a terminal temperature Tnow before an initial transmission of data entered from the connector 10 is commenced or before a transmission power is changed. The input temperature is a temperature that has been detected by the temperature detecting unit 21 and converted into a digital signal by the AD converter 20.

In Step Sa2, the control unit 16 determines whether or not the terminal temperature Tnow is less than a threshold or upper limit "$T_{operation\_max}$" of a predetermined allowable temperature range or a predetermined operation guarantee temperature range in which the wireless communication terminal 1 is guaranteed to perform predetermined functions and operations.

In Step Sa3, if the control unit 16 determines that the terminal temperature Tnow is not less than the threshold or upper limit "Toperation_max", then this means that the wireless communication terminal 1 is fallen into overheat state and the wireless communication terminal 1 is not guaranteed to perform predetermined functions and operations. The control unit 16 displays an alert that the wireless communication terminal 1 is fallen into overheat state. The display can be made on a screen of the wireless communication terminal 1.

In Step Sa4, the control unit 16 can stop or discontinue the transmission operation. In other case, the control unit 16 can turn power OFF to terminate operations of the wireless communication terminal 1.

In Step Sa5, if the control unit 16 determines that the terminal temperature Tnow is less than the threshold or upper limit "$T_{operation\_max}$", then this means that the wireless communication terminal 1 remains in the operation-guaranteed state. The control unit 16 calculates an ambient temperature $T_a$ from the terminal temperature Tnow. A temperature difference ΔT between the terminal temperature and the ambient temperature at a transmission power Pn has previously been measured. The measured temperature difference ΔT is set as $ΔT_{pn}$ that corresponds to the transmission power Pn. The temperature difference $ΔT_{pn}$ at the transmission power Pn is stored in the memory unit 30. The control unit 16 detects the terminal temperature $T_{now}$, wherein the terminal temperature has been measured by the temperature detecting unit 21 and the measured terminal temperature has been converted to a digital signal as the terminal temperature $T_{now}$ by the AD converter 18. The control unit 16 also detects the transmission power Pn, wherein the transmission power has been detected by the transmission power detecting unit 19, and the detected transmission power has been converted to a digital signal as the transmission power Pn. The control unit 16 reads, from the memory unit 39, the temperature difference $\Delta T_{pn}$ that corresponds to the detected transmission power Pn. The control unit 16 calculates the ambient temperature $T_a$ based on the detected terminal temperature Tnow and the temperature difference $\Delta T_{pn}$. For example, the control unit 16 performs a subtraction of the temperature difference $\Delta T_{pn}$ from the detected terminal temperature Tnow to find the ambient temperature $T_a$.

In Step Sa6, the control unit 16 measures a variation of the terminal temperature per unit time or a time-differential quantity of the terminal temperature, wherein the terminal temperature has been detected by the temperature detecting unit 21.

In Step Sa7, the control unit 16 determines whether or not the measured time-differential quantity of the terminal temperature is zero or almost zero. Namely, the control unit 16 determines whether or not the terminal temperature remains constant or almost constant over time. For example, a slow temperature increasing rate of not more than 1° C. for 10 minutes can be considered to be "almost constant" or that the measured time-differential quantity of the terminal temperature is almost zero.

In Step Sa10, if the control unit 16 determines that the measured time-differential quantity of the terminal temperature is zero or almost zero, the control unit 16 adds a predetermined value to the current transmission power level in accordance with the instructions to increase the transmission power. The instructions to increase the transmission power are included in a transmission power changing request that has been transmitted from the wireless base station. The control unit 16 sets a changed transmission power Pm that corresponds to the sum of the predetermined value and the current transmission power level. The control unit 30 selects a terminal temperature variation information, for example, Curve $[Pn, Pm]_{Ta}$ from the temperature increase/decrease curve table 31 that is stored in the memory unit 30. The control unit 30 performs the selection based on the ambient temperature $T_a$, the original transmission power Pn, and the changed transmission power Pm.

In Step Sa11, the control unit 16 prepares a graph 1 that is shown in FIG. 4A from the terminal temperature variation information Curve $[Pn, Pm]_{Ta}$. The graph 1 represents the Curve $[Pn, Pm]_{Ta}$. The Curve $[Pn, Pm]_{Ta}$ crosses a threshold or upper limit $T_{operation\_max}$ of the allowable temperature range or the operation guarantee temperature range, wherein the threshold or upper limit $T_{operation\_max}$ has been predetermined. The control unit 16 calculates an operation guarantee time $t_{overheat}$ from the crossing point of the Curve $[Pn, Pm]_{Ta}$ and the threshold or upper limit $T_{operation\_max}$. The operation guarantee time $t_{overheat}$ is a time until the temperature reaches the threshold or upper limit $T_{operation\_max}$. The control unit 16 sends the scheduling unit 13 the terminal temperature variation information of the graph 1 and the operation guarantee time $t_{overheat}$. The transmission data quantity calculating unit 11 and tile transmission time calculating unit 12 calculate a transmission time $t_{req}$ that is necessary for transmitting data. The transmission data quantity calculating unit 11 and the transmission time calculating unit 12 sends the calculated transmission time $t_{req}$ to the scheduling unit 13.

In Step Sa12, the scheduling unit 13 compares the operation guarantee time $t_{overheat}$ to the transmission time $t_{req}$ so that the scheduling unit 13 determines whether or not the operation guarantee time $t_{overheat}$ is beyond the transmission time $t_{req}$.

Figure 5:
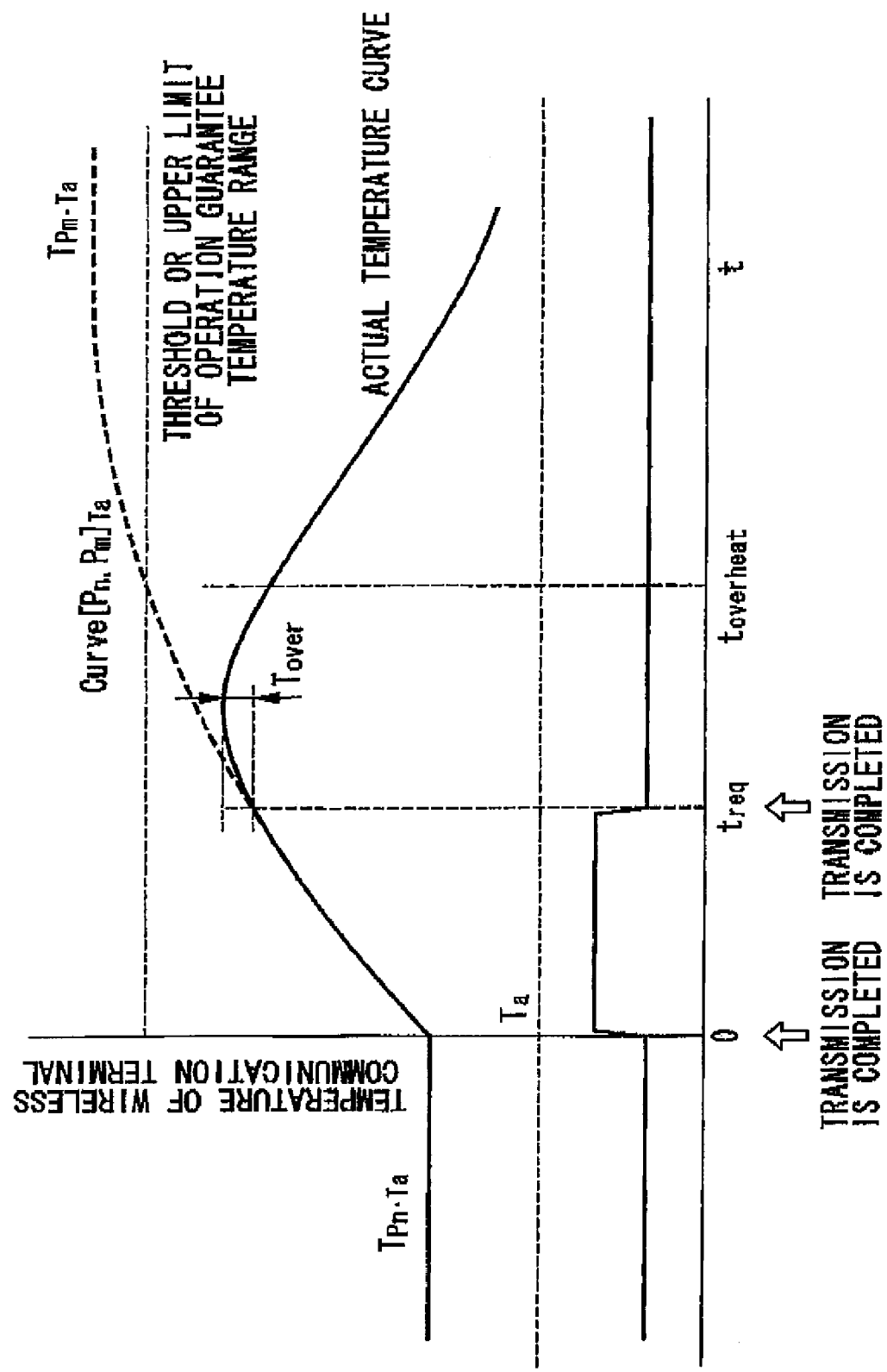
FIG. 5 is a diagram illustrating a time-variation of the temperature of the wireless communication terminal in accordance with the first embodiment of the present invention.

In Step Sa13, if the scheduling unit 13 determines that the operation guarantee time $t_{overheat}$ is beyond the transmission time $t_{req}$, the scheduling unit 13 calculates a terminal temperature $T_{@treq}$ from a crossing point of the transmission time $t_{req}$ and the terminal temperature variation information Curve $[Pn, Pm]_{Ta}$ of the graph 1 at has been supplied from the control unit 16. The scheduling unit 13 calculates a sum of the terminal temperature $T_{@treq}$ and a predetermined temperature increasing value $T_{Over}$. The scheduling unit 13 determines whether or not the sum of the teal temperature $T_{@treq}$ and the predetermined temperature increasing value $T_{Over}$ is less than the threshold or upper limit $T_{operation\_max}$ of the allowable temperature range or the operation guarantee temperature range. FIG. 5 is a diagram illustrating a time-variation of the temperature of the wireless communication terminal. The temperature increasing value $T_{Over}$ is a predetermined value that corresponds to an unintended temperature increase after the transmission was discontinued. The unintended temperature increase is caused by heat inertia after the transmission was discontinued. The temperature increasing value $T_{Over}$ has previously been stored in the memory unit 30. The control unit 16 reads the temperature increasing value $T_{Over}$ out of the memory unit 30. The control unit 16 supplies the temperature increasing value $T_{Over}$ to the scheduling unit 13.

In Step Sa15, if the scheduling unit 13 determines that the sum of the terminal temperature $T_{@treq}$ and the predetermined temperature increasing value $T_{Over}$ is less than the threshold or upper limit $T_{operation\_max}$ of the allowable temperature range or the operation guarantee temperature range, then the scheduling unit 13 prepares schedule information for transmitting all data. The scheduling unit 13 supplies the schedule information for transmitting all data to the transmission control unit 14. The transmission control unit 14 renders the data buffer 17 transmit all data at the transmission power Pm in accordance with the inputted schedule information and the transmission power value.

In Step Sa14, if the scheduling unit 13 determines, in Step Sa12, that the operation guarantee time $t_{overheat}$ is not beyond the transmission time $t_{req}$ and if the scheduling unit 13 determines that the sum of the terminal temperature $T_{@treq}$ and the predetermined temperature increasing value $T_{Over}$ is not less than the threshold or upper limit $T_{operation\_max}$ of the allowable temperature range or the operation guarantee temperature range, then the scheduling unit 13 prepares schedule information for transmitting divided frames of data. The scheduling unit 13 supplies the schedule information for transmitting divided frames of data to the transmission control unit 14. The control unit 16 supplies the transmission power Pm to the transmission control unit 14. The transmission control unit 14 renders the data buffer 17 transmit divided frames of data at the transmission power Pm in accordance with the inputted schedule information and the transmission power value.

In Step Sa8, if the control unit 16 determines, in Step Sa7, that the measured time-differential quantity of the terminal temperature is not zero or not almost zero, then the control unit 16 determines whether or not the differential quantity is positive. If the control unit 16 determines that the differential quantity is less than zero, this means that the temperature is decreasing. The control unit 16 performs the process of Step Sa10.

In Step Sa20, if the control unit 16 determines that the differential quantity is more than zero, this means that the temperature is increasing. The control unit 16 refers historical information of temperature variation over time after the transmission was started. The control unit 16 determines whether or not a terminal temperature constant state has appeared after the transmission was started, wherein the terminal temperature constant state is a state in which the terminal temperature is constant. The control unit 16 calculates a gradient of the temperature variation or a differential quantity of the temperature variation from the historic information of temperature variation over time. The control unit 16 compares the calculated differential quantity of the temperature variation to a predetermined reference value. The control unit 16 determines whether the calculated differential quantity of the temperature variation remains lower the predetermined reference value for a predetermined period of time or longer. If the control unit 16 determines that the calculated differential quantity of the temperature variation remains lower the predetermined reference value for the predetermined period of time or longer, then this means that the terminal temperature constant state has appeared after the transmission was started. A typical example of the predetermined reference value can be, but is not limited to, a temperature variation rate of 1° C. per 10 minutes.

In Step Sa21, if the control unit 16 determines that the terminal temperature constant state has not appeared since the transmission was started, then the control unit 16 sets a predetermined initial transmission power to be $P_0$, wherein the predetermined initial transmission power $P_0$ is a transmission power before the transmission starts. The control unit 16 reads a temperature difference $\Delta T_{po}$ at the predetermined initial transmission power $P_0$ from the read memory 30. The control unit 16 calculates a subtraction of $\Delta T_{p0}$ from $\Delta T_{P0,Ta}$ to find the ambient temperature $T_a$.

In Step Sa22, the control unit 16 selects a terminal temperature variation information, for examples Curve $[P_0, Pm]_{Ta}$ from the temperature increase/decrease curve table 31 that is stored in the memory unit 30. The control unit 30 performs the selection based on the calculated ambient temperature $T_a$, the initial transmission power $P_0$ in the constant transmission power state, and the transmission power Pm that is necessary for the data transmission.

In Step Sa23, the control unit 16 prepares the graph 1 that is shown in FIG. 4A from the terminal temperature variation information Curve $[P_0, Pm]_{Ta}$. The graph 1 represents the Curve $[P_0, Pm]_{Ta}$. The Curve $[P_0, Pm]_{Ta}$ crosses a threshold or upper limit $T_{operation\_max}$ of the allowable temperature range or the operation guarantee temperature range, wherein the threshold or upper limit $T_{operation\_max}$ has been predetermined. The control unit 16 calculates an operation guarantee time $t_{overheat}$ from the crossing point of the Curve $[P_0, Pm]_{Ta}$ and the threshold or upper limit $T_{operation\_max}$. The operation guarantee time $t_{overheat}$ is a time until the temperature reaches the threshold or upper limit $T_{operation\_max}$. The control unit 16 sends the scheduling unit 13 the terminal temperature variation information of the graph 1 and the operation guarantee time $t_{overheat}$. The transmission data quantity calculating unit 11 and the transmission time calculating unit 12 calculate a transmission time $t_{req}$ that is necessary for transmitting data. The transmission data quantity calculating unit 11 and the transmission time calculating unit 12 sends the calculated transmission time $t_{req}$ to the scheduling unit 13. The scheduling unit 13 performs the processes in Step Sa12.

In Step Sa24, if the control unit 16 determines that the terminal temperature constant state has appeared after the transmission was started, then the control unit 16 detects a transmission power Pk in the terminal temperature constant state. The control unit 16 reads a temperature difference $\Delta T_{pk}$ at the transmission power Pk from the read memory 30. The control unit 16 calculates a subtraction of $\Delta T_{pk}$ from $\Delta T_{Pk,Ta}$ to find the ambient temperature $T_a$.

In Step Sa25, the control unit 16 selects a terminal temperature variation information, for example, Curve $[P_k, Pm]_{Ta}$ from the temperature increase/decrease curve table 31 that is stored in the memory unit 30. The control unit 30 performs the selection based on the calculated ambient temperature $T_a$, the constant transmission power $P_k$ in the constant transmission power state, and the transmission power Pm that is necessary for the data transmission.

In Step Sa26, the control unit 16 prepares a graph 2 that is shown in FIG. 4B from the terminal temperature variation information Curve $[P_k, Pm]_{Ta}$. The graph 2 represents the Curve $[P_k, Pm]_{Ta}$. The Curve $[P_k, Pm]_{Ta}$ crosses a threshold or upper limit $T_{operation\_max}$ of the allowable temperature range or the operation guarantee temperature range, wherein the threshold or upper limit $T_{operation\_max}$ has been predetermined. The control unit 16 calculates an operation guarantee time $t_{overheat}$ from the crossing point of the Curve $[P_k, Pm]_{Ta}$ and the threshold or upper limit $T_{operation\_max}$. The operation guarantee time $t_{overheat}$ is a time until the temperature reaches the threshold or upper limit $T_{operation\_max}$. The control unit 16 sends the scheduling unit 13 the terminal temperature variation information of the graph 2 and the operation guarantee time $t_{overheat}$. The transmission data quantity calculating unit 11 and the transmission time calculating unit 12 calculate a transmission time $t_{req}$ that is necessary for transmitting data. The transmission data quantity calculating unit 11 and the transmission time calculating unit 12 sends the calculated transmission time $t_{req}$ to the scheduling unit 13. The scheduling unit 13 performs the processes in Step Sa12.

As described above, the wireless communication terminal 1 is configured to transmit divided frames of data if the terminal temperature is over the operation guarantee temperature. If the terminal temperature is increasing, the wireless communication terminal 1 is also configured so that an unchanged transmission power is set based on the past variations of the terminal temperature, and the operation guarantee time until the terminal temperature reaches the threshold or upper limit of the allowable temperature range or operation guarantee temperature range is calculated based on the terminal temperature variation information.

Figure 6:
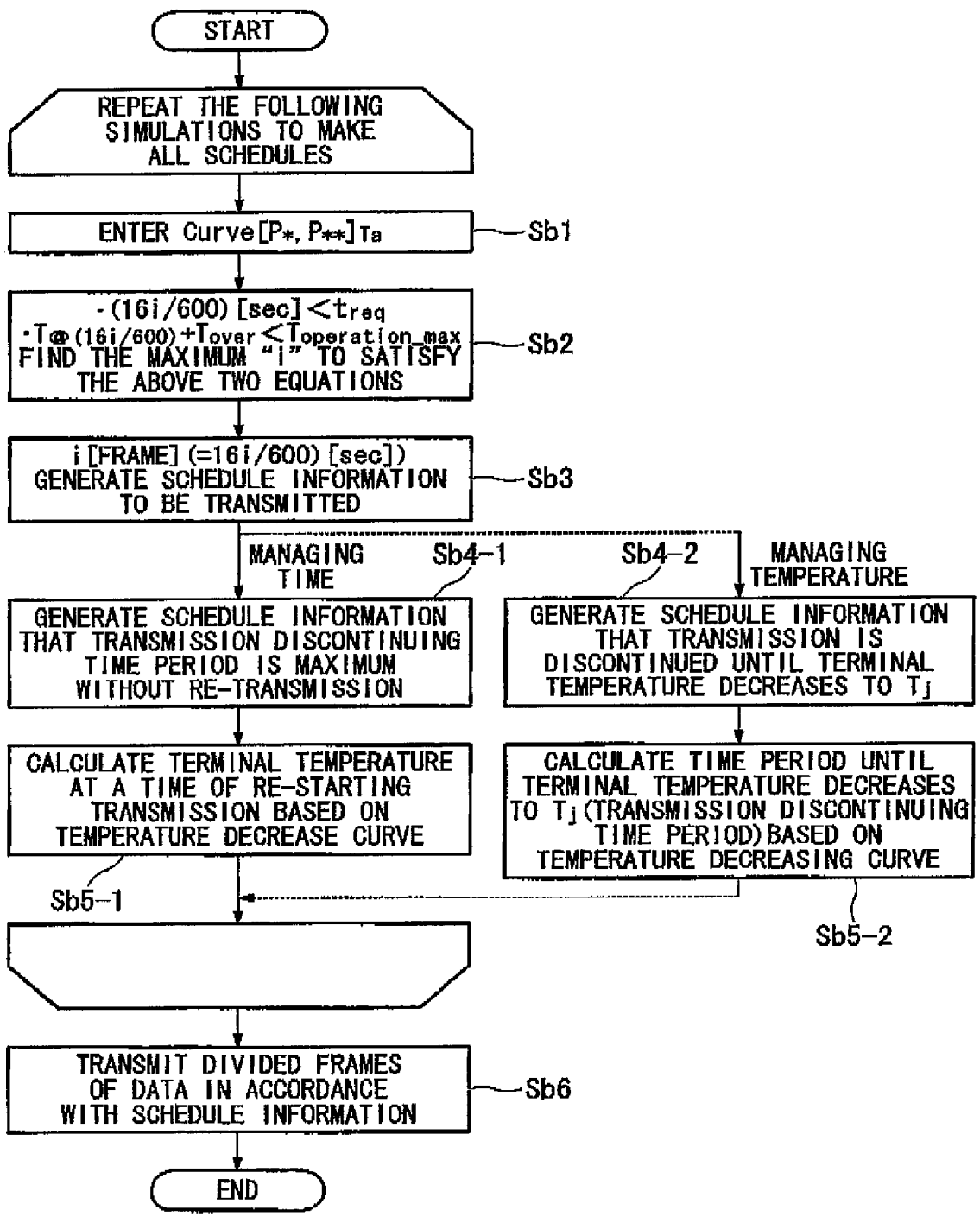
FIG. 6 is a flow chart illustrating processes for transmission of divided frames of data in Step Sa14 of FIG. 3 in accordance with the first embodiment of the present invention.

FIG. 6 is a flow chart illustrating processes for transmission of divided frames of data in Step Sa14 of FIG. 3.

In Step Sb1, the control unit 16 supplies the terminal temperature variation information Curve $[P_*, P_{**}]_{Ta}$ to the scheduling unit 13.

In Step Sb2, the scheduling unit 13 calculates a maximum value "i" that satisfies the following equations (1) and (2).

$$(161i/600)[\sec] < t_{req} \qquad (1)$$

$$T_{@(161i/600)} + T_{over} < t_{operation\_max} \qquad (2)$$

If the value "i" satisfies the above two equations (1) and (2). then this means that continuous transmission of the number "i" of data frames does not cause the terminal temperature to reach the upper limit of the operation guarantee temperature range. Finding the maximum value "i" satisfying the above two equations (1) and (2) means finding the maximum number of data frames that is continuously transmitted without causing the terminal temperature to exceed the upper limit of the operation guarantee temperature range.

In Step Sb3, the scheduling unit 13 prepares schedule information for transmitting the number "i" of divided frames of data. The scheduling unit 13 prepares schedule information that includes timings to start and discontinue the transmissions so as to control the terminal temperature within the operation guarantee temperature range. The preparation of the schedule information can be made in accordance with the following two processes.

(First Process)

The first process is performed when a time management is made to maintain the terminal temperature within the operation guarantee temperature range.

In Step Sb4-1, the scheduling unit 13 prepares schedule information that a maximum time of discontinuing the transmission is set without conducting retransmission.

In Step Sb5-1, the scheduling unit 13 prepares temperature decrease information, for example, temperature decrease curve that represents the temperature decrease when the transmission is discontinued. The preparation is made based on the terminal temperature variation information supplied by the control unit 16. The scheduling unit 13 calculates a terminal temperature after the transmission discontinuing time has lapsed or when the transmission restarts. The calculation is made based on the prepared temperature decrease information.

(Second Process)

The second process is performed when a temperature management is made to maintain the terminal temperature within the operation guarantee temperature range.

In Step Sb4-2, the scheduling unit 13 prepares schedule information that the transmission is discontinued until the terminal temperature decreases to a transmission restart reference temperature $T_i$.

In Step Sb5-2, the scheduling unit 13 prepares temperature decrease information, for example, temperate decrease curve that represents the temperature decrease when the transmission is discontinued. The preparation is made based on the terminal temperature variation information supplied by the control unit 16. The scheduling unit 13 calculates a transmission discontinuing period of time until the terminal temperature decreases to the transmission restart reference temperature $T_i$. The calculation is made based on the prepared temperature decrease information.

In Step Sb6, the scheduling unit 13 repeats the above-described set of the processes in Steps Sb1 through Sb5-1 or Steps Sb1 through Sb5-2 so as to prepare all of schedule information for transmissions of all data. The scheduling unit 13 sends all of the prepared schedule information to the transmission control unit 14. The transmission control unit 14 renders the data buffer 17 transmit divided frames of data in accordance with the received schedule information.

Figure 7:
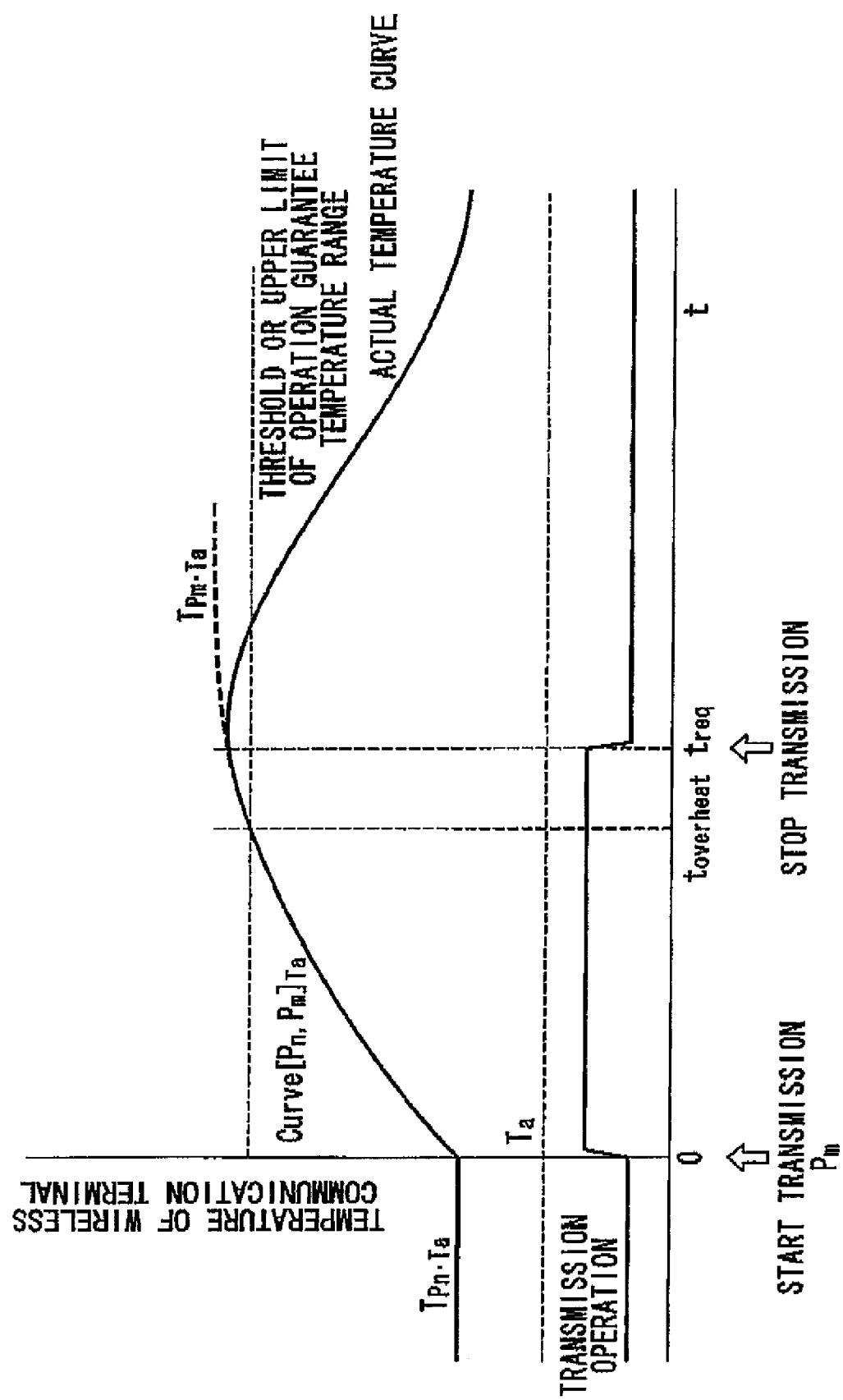
FIG. 7 is a diagram illustrating an actual terminal temperature variation over time while transmitting data without dividing data in accordance with the first embodiment of the present invention.
Figure 8:
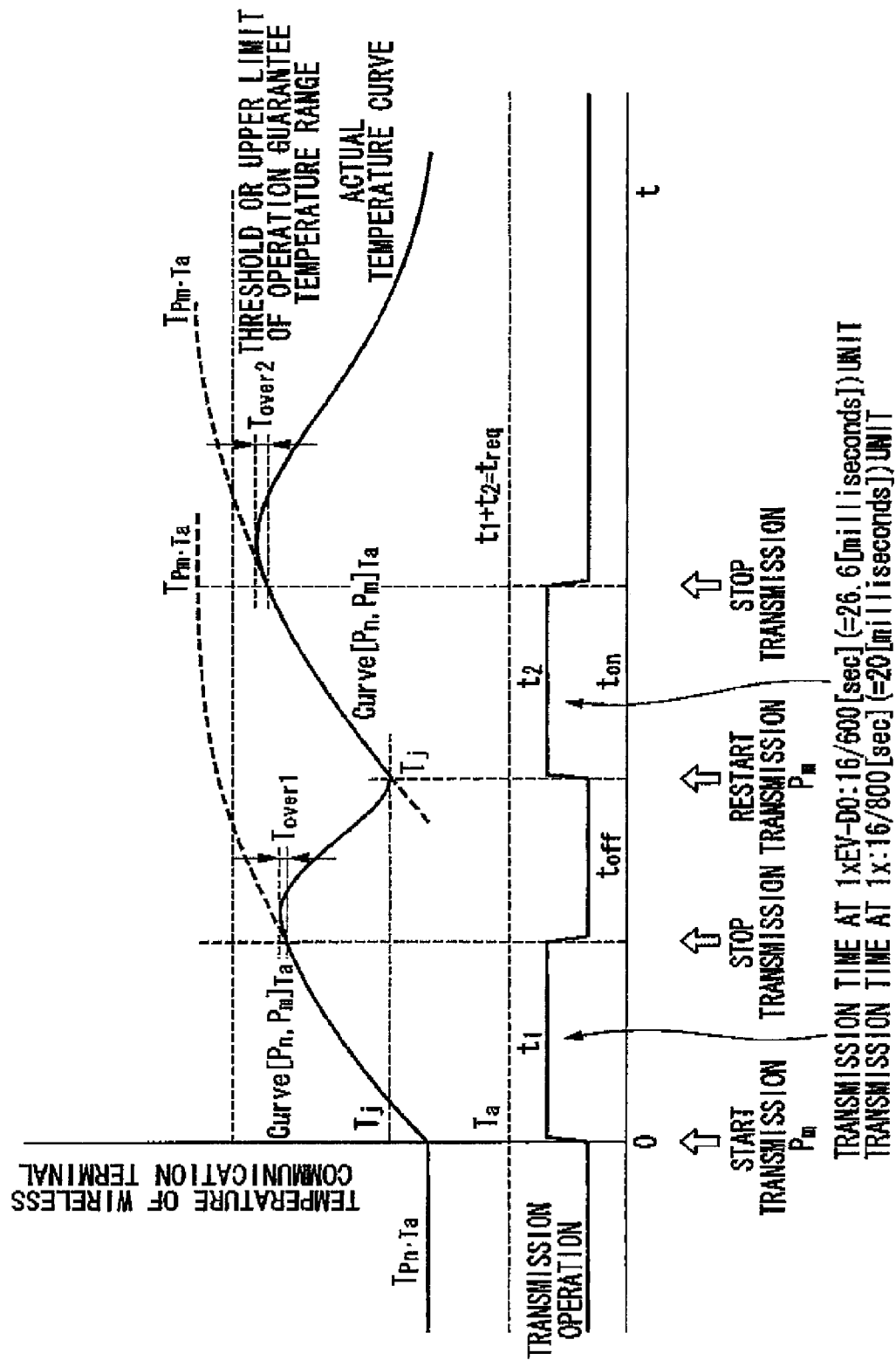
FIG. 8 is a diagram illustrating an actual terminal temperature variation over time while transmitting divided frames of data under the temperature management of the second process to maintain the terminal temperature within the operation guarantee temperature range in accordance with the first embodiment of the present invention.

The above-described processes for transmitting the divided frames of data are performed to prevent the terminal temperature from rising over the upper limit of the operation guarantee temperature range. FIG. 7 is a diagram illustrating an actual terminal temperature variation over time while transmitting data without dividing data. FIG. 8 is a diagram illustrating an actual terminal temperature variation over time while transmitting divided frames of data under the temperature management of the second process to maintain the terminal temperature within the operation guarantee temperature range. As shown in FIG. 7, if the data is continuously transmitted, the terminal temperature increases over the upper limit of the operation guarantee temperature range. As shown in FIG. 8, if the divided frames of data are discontinuously transmitted, then the terminal temperature is maintained within the operation guarantee temperature range without rising over the upper limit thereof.

"$16/600$[sec]=26.6[msec]" appearing in the above-described two equations (1) and (2) is the unit of a single frame when CDMA 1xEV-DO communication system is used.

"$8/600$[sec]=20[msec]" is the unit of one of divided frames when CDMA. 1x communication system is used.

Figure 9:
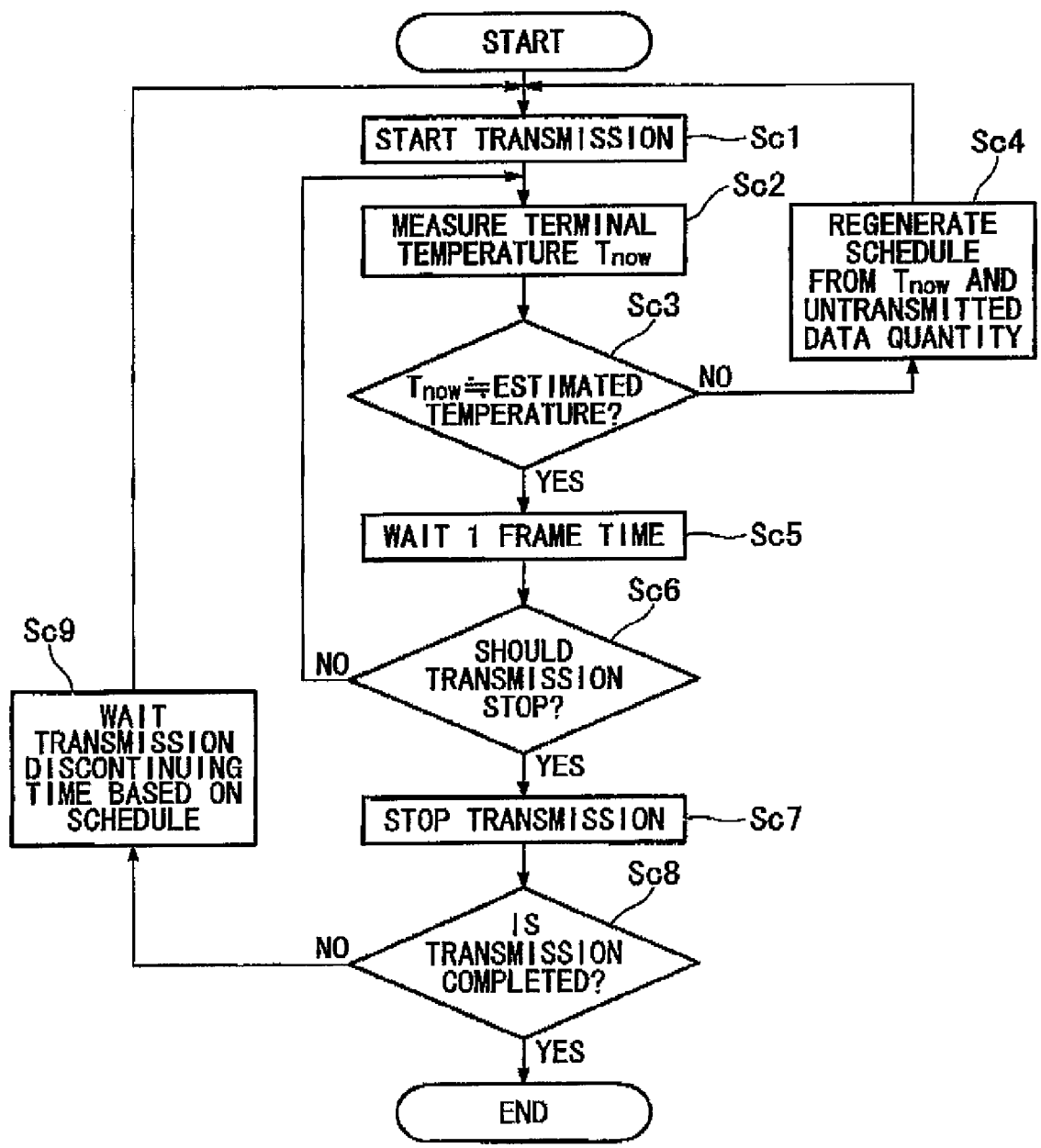
FIG. 9 is a flow chart illustrating processes for detecting terminal temperature and re-preparing schedule information while discontinuously transmitting the divided frames of data in Step Sb6 of FIG. 6 in accordance with the first embodiment of the present invention.

FIG. 9 is a flow chart illustrating processes for detecting terminal temperature and re-preparing schedule information while discontinuously transmitting the divided frames of data in Step Sb6 of FIG. 6.

In Step Sc1, the data buffer 17 outputs divided frames of data to start data transmissions.

In Step Sc2, the control unit 16 detects or measures a terminal temperature $T_{now}$, wherein a terminal temperature is measured by the temperature detecting unit 21 and the measured terminal temperature is ten converted into a digital signal as the terminal temperature $T_{now}$ by the AD converter 20.

In Step Sc3, the control unit 16 calculates an estimated temperature at a lapsed time based on the terminal temperature variation information and the time lapsed from the sit of the transmission. The terminal temperature variation information is the information used by the scheduling unit 13 to have prepared the schedule information of transmission of data. The control unit 16 compares the detected terminal temperature $T_{now}$ with the calculated estimation of temperature so that the control unit 16 determines whether or not the terminal temperature $T_{now}$ is just or almost equal to the calculated estimation of temperature. A typical example of error range can be, but is not limited to, an error range x[LSB] of the AD converter, for example, ±x[LSB]. "LSB" is Least Significant Bit that represents the unit.

In Step Sc4, if the control unit 16 determines that the terminal temperature $T_{now}$ is different from the calculated estimation of temperature, then the control unit 16 renders the scheduling unit 13 re-prepare schedule information in the processes shown in FIG. 6, based on the terminal temperature $T_{now}$ and the untransmitted data quantity. The data buffer 17 outputs divided frames of data to start data transmissions in Step Sc1.

In Step Sc5, if the control unit 16 determines that the terminal temperature $T_{now}$ is just or almost equal to the calculated estimation of temperature, then the control unit 16 waits a time period of one frame.

In Step Sc6, after the time of one frame has lapsed, the control unit 16 determines whether or not the current time reaches the timing of discontinuing tie transmission. The determination is made based on the schedule information to which the transmission control unit 14 refers. The schedule information is supplied from the scheduling unit 13. If the control unit 16 determines that the current time have not yet reached the timing of discontinuing the transmission, then the control unit 16 measures the terminal temperature $T_{now}$.

In Step Sc8, if the control unit 16 determines that the current time reaches the timing of discontinuing the transmission, then the control unit 16 renders the transmission control unit 14 discontinue the current transmission. The control unit 16 determines whether or not the transmission should have been completed. The determination is made based on the schedule information supplied from the scheduling unit 13.

In Step Sc9, if the control unit 16 determines that the transmission should not have been completed yet, then the control unit 16 renders the transmission control unit 14 wait a transmission discontinuation time prior to restarting the transmission in accordance with the schedule information.

In Step Sc7, if the control unit 16 determines that the transmission should have been completed, then the control unit 16 renders the transmission control unit 14 complete the transmission.

In accordance with the processes shown in FIG. 9, the ambient temperature can increase thereby increasing a difference between the terminal temperature and the estimated temperature. In this case, new schedule information is prepared by the scheduling unit 13 while transmitting the divided frames of data so as to maintain the terminal temperature within the operation guarantee temperature range.

Figure 10:
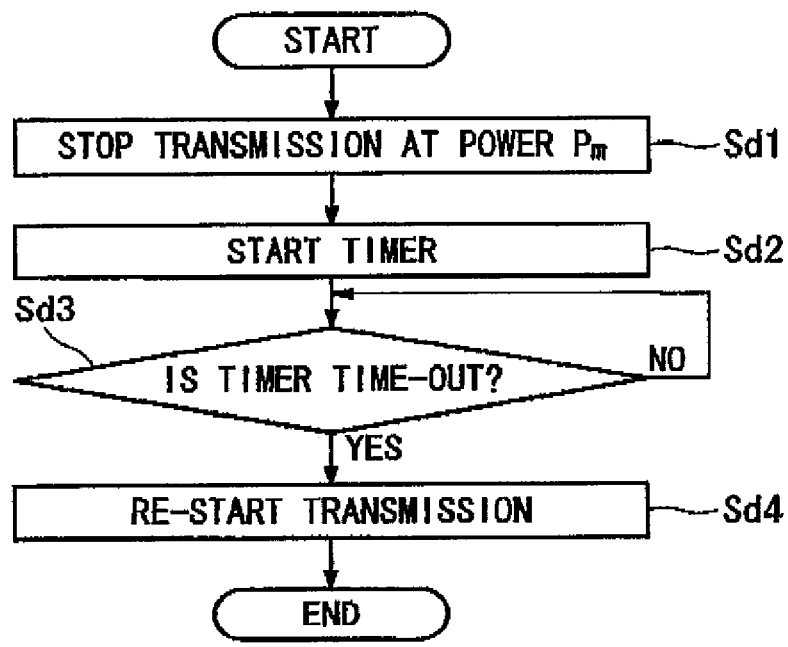
FIG. 10 is a flow chart illustrating tine management processes shown in FIG. 6 for maintaining the terminal temperature within the operation guarantee temperature range in accordance with the first embodiment of the present invention.

FIG. 10 is a flow chart illustrating time management processes shown in FIG. 6 for maintaining the terminal temperature within the operation guarantee temperature range.

In Step Sd1, the transmission at the power Pm is discontinued.

In Step Sd2, the control unit 16 starts an integrated timer so hat the integrated timer detects that the current time reaches the maximum limit of an allowable time period of waiting for the retransmission and then the integrated timer outputs a notice of timeout.

In Step Sd3, the control unit 16 remains in the stand-by state until the control unit 16 receives the notice of timeout from the integrated timer.

In Step Sd41, when the control unit 16 receives the notice of timeout from the integrated timer, then the control unit 16 renders the transmission control unit 14 restart the transmission.

The control unit 16 can receive the notice of a time when the re-transmission will be made from the integrated timer so that the control unit 16 renders the transmission control unit 14 restart transmission before the re-transmission will be made.

The temperature management processes shown in FIG. 6 for maintaining the terminal temperature within the operation guarantee temperature range will be described with reference to FIGS. 11 through 13.

Figure 11:
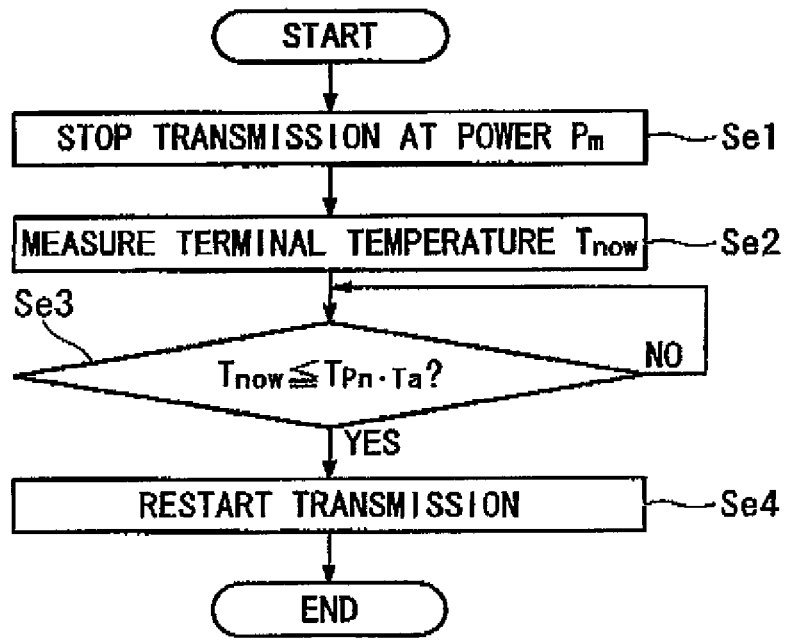
FIG. 11 is a flow chart illustrating the temperature management processes when the transmission restart reference temperature $T_i$ is set to be a terminal temperature $T_{Pn, Ta}$ at the power Pn before the transmission will start in accordance with the first embodiment of the present invention.

FIG. 11 is a flow chart illustrating the temperature management processes when the transmission restart reference temperature $T_i$ is set to be a terminal temperature $T_{Pn,Ta}$ at the power Pn before the transmission will start.

In Step Se1, the transmission at the power Pm is discontinued.

In Step Se2, the control unit 16 detects the terminal temperature $T_{now}$, wherein the terminal temperature has been measured by the temperature detecting unit 21 and the measured terminal temperature has been converted to a digital signal as the terminal temperature $T_{now}$ by the AD converter 20.

In Step Se3, the control unit 16 compares the terminal temperature $T_{now}$ with the terminal temperature $T_{Pn,Ta}$ at the original transmission power Pn that has not yet been changed. The control unit 16 determines whether or not the terminal temperature $T_{now}$ is equal to or lower than the terminal temperature $T_{Pn,Ta}$. If the control unit 16 determines that the terminal temperature $T_{now}$ is higher than the terminal temperature $T_{Pn,Ta}$, then the control unit 16 detects the terminal temperature $T_{now}$.

In Step Se4, if the control unit 16 determines that the terminal temperature $T_{now}$ is equal to or lower than the terminal temperature $T_{Pn,Ta}$, then the control unit 16 renders the transmission control unit 14 restart the transmission.

The control unit 16 renders the transmission control unit 14 wait for restart of transmission until the terminal temperature $T_{now}$ becomes equal to or lower than the terminal temperature $T_{Pn,Ta}$.

The following descriptions will be made with reference to FIGS. 12 and 13. The transmission restart reference temperature $T_i$ is calculated so as to take a maximum ratio of a time $T_{on}$ to a time $T_{off}$, where the time $T_{on}$ is a time when the transmission is being performed, and the time $T_{off}$ is a time when the transmission is being discontinued. The transmission is continued based on the calculated transmission restart reference temperature $T_i$.

Figure 12:
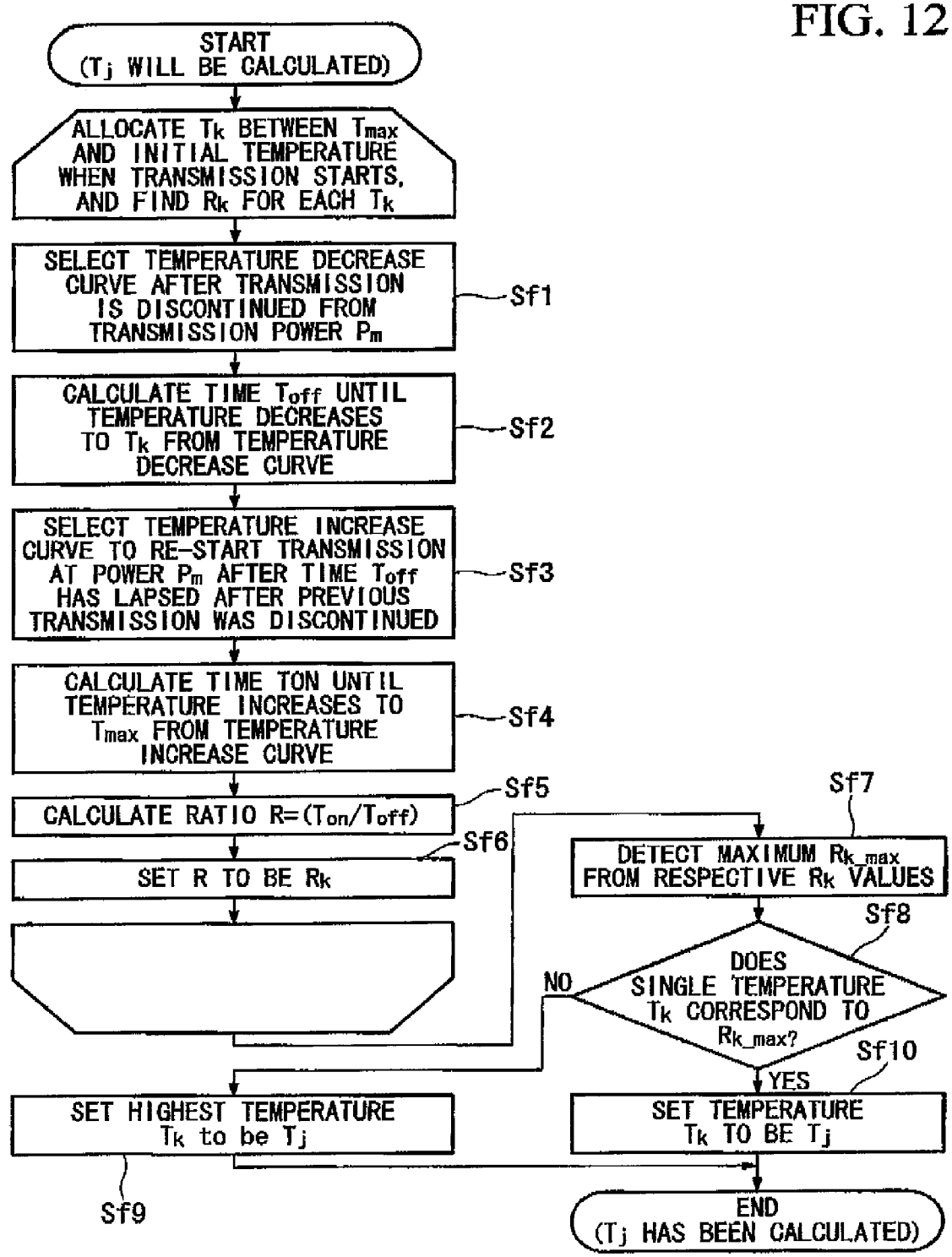
FIG. 12 is a flow chart illustrating processes for calculating the transmission restart reference temperature $T_i$ in accordance with the first embodiment of the present invention.

FIG. 12 is a flow chart illustrating processes for calculating the transmission restart reference temperature $T_i$.

A temperature range is defined between the initial terminal temperature when the transmission starts and the threshold or upper limit $T_{max}$ of the operation guarantee temperature range. The temperature range is divided into a plurality of uniform temperature sub-ranges. Temperature values $T_k$ are allocated to boundaries of the plurality of uniform temperature sub-ranges. The upper limit is set to be $T_{max}$ because the transmission restarts reference temperature $T_i$ is calculated assuming that the terminal temperature increases to the upper limit of the operation guarantee temperature range after the transmission at the power Pm is discontinued In Step Sf1, after the temperature values $T_k$ are allocated, the control unit 16 selects a temperature decrease curve as the terminal temperature variation information at a first temperature value $T_k$ from the temperature increase/decrease curve 31. The selection is made based on the transmission power Pm, the transmission power when the transmission is discontinued, arid the ambient temperature $T_a$ when the transmission is discontinued. The selected terminal temperature variation information is the temperature decrease curve because the transmission power decreases due to discontinuation of the transmission.

In Step Sf2, the control unit 16 calculates the time $T_{off}$ until the terminal temperature decreases to the first temperature value $T_k$. The calculation is made based on the terminal temperature variation information or the temperature decrease curve.

In Step Sf3, the control unit 16 selects, from the temperature increase/decrease curve 31, a temperature increase curve as terminal temperature variation information for restating the transmission at the power Pm when the time $T_{off}$ has lapsed after the transmission was discontinued. Since the transmission power is increasing, the selected terminal temperature variation information is the temperature increase curve.

In Step Sf4, the control unit 16 calculates the time $T_{on}$ until the terminal temperature increases to $T_{max}$. The calculation is made based on the terminal temperature variation information.

In Step Sf5, the control unit 16 calculates the ratio "R" of $T_{on}/T_{off}$ based on the calculated times $T_{on}$ and $T_{off}$.

$$R = t_{on}/t_{off} \tag{3}$$

In Step Sf6, the control unit 16 renders the memory unit 30 store the calculated ratio "R" as "$R_k$". A set of the processes in Steps Sf1 to Sf6 will be repeated for all of the plurality of the temperature values $T_k$.

In Step Sf7, after the processes in Steps Sf1 to Sf6 has been repeated for all of the plurality of the temperature values $T_k$, then the control unit 16 detects a maximum value from ale plural values of ratio "$R_k$". The control unit 16 sets the detected maximum ratio $R_k$ to be $R_{k\_max}$.

In Step Sf8, the control unit 16 determines whether or not only one of the temperature values $T_k$ corresponds to the maximum ratio $R_{k\_max}$.

In Step Sf9. if the control unit 16 determines that only one of the temperature values $T_k$ corresponds to the maximum ratio $R_{k\_max}$, then the control unit 16 sets a temperature value $T_k$ corresponding to the maximum ratio $R_{k\_max}$ to be the transmission restart reference temperature $T_i$.

In Step Sf10, if the control unit 16 determines that two or more of the temperature values $T_k$ correspond to the maximum ratio $R_{k\_max}$, then the control unit 16 sets a highest temperature value $T_k$ of the two or more temperature values $T_k$ corresponding to the maximum ratio $R_{k\_max}$ to be the transmission restart reference temperature $T_i$.

Figure 13:
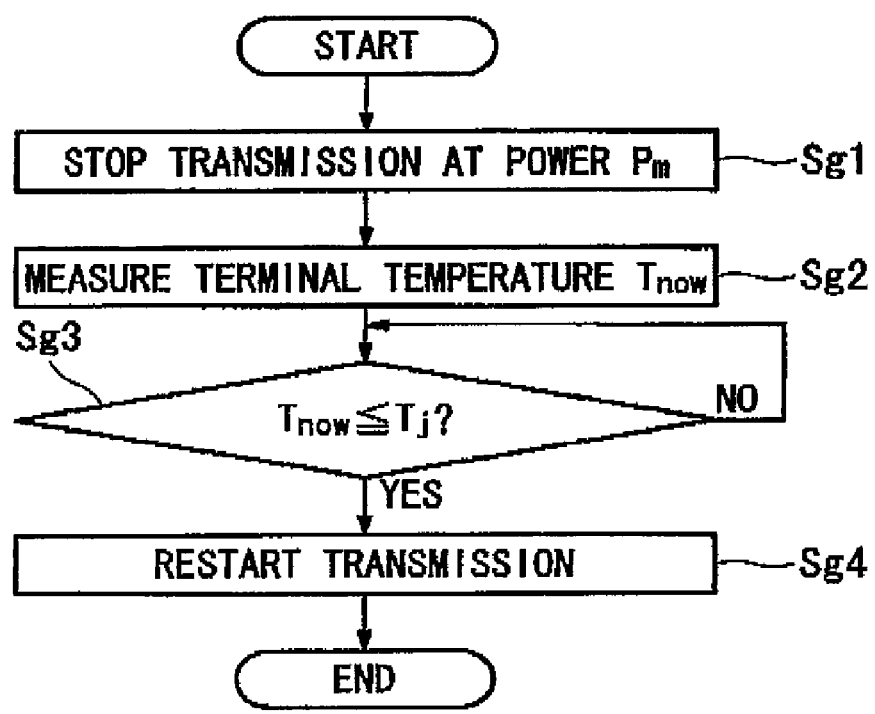
FIG. 13 is a flow chart illustrating processes for discontinuing transmission with reference to the transmission restart reference temperature $T_i$ that has been set in the processes shown in FIG. 12 in accordance with the first embodiment of the present invention.

FIG. 13 is a flow chart illustrating processes for discontinuing transmission with reference to the transmission restart reference temperature $T_i$ that has been set in the processes shown in FIG. 12.

In Step Sg1, the transmission at the power Pm is discontinued.

In Step Sg2, the control unit 16 detects the terminal temperature $T_{now}$ that has been detected by the temperature detecting unit 21 when the transmission is discontinued.

In Step Sg3, the control unit 16 compares the terminal temperature $T_{now}$ with the transmission restart reference temperature $T_i$ that has been set by the processes shown in FIG. 12. The control unit 16 determines whether or not the terminal temperature $T_{now}$ is equal to or less than the transmission restart reference temperature $T_i$. If the control unit 16 determines that the terminal temperature $T_{now}$ is higher than the transmission restart reference temperature $T_i$, then the control unit 16 detects the terminal temperature $T_{now}$ in Step Sg2.

In Step Sg4, if the control unit 16 determines whether or not the terminal temperature $T_{now}$ is equal to or less than the transmission restart reference temperature $T_i$, then the control unit 16 renders the transmission control unit 14 restart the transmission.

The processes that are shown in FIG. 12 set the transmission restart reference temperature $T_i$ so as to maximize the ratio R of $T_{on}/T_{off}$, whereby the transmission is discontinued under the control to realize the longest possible transmission time. This improves the transmission efficiency.

Figure 14:
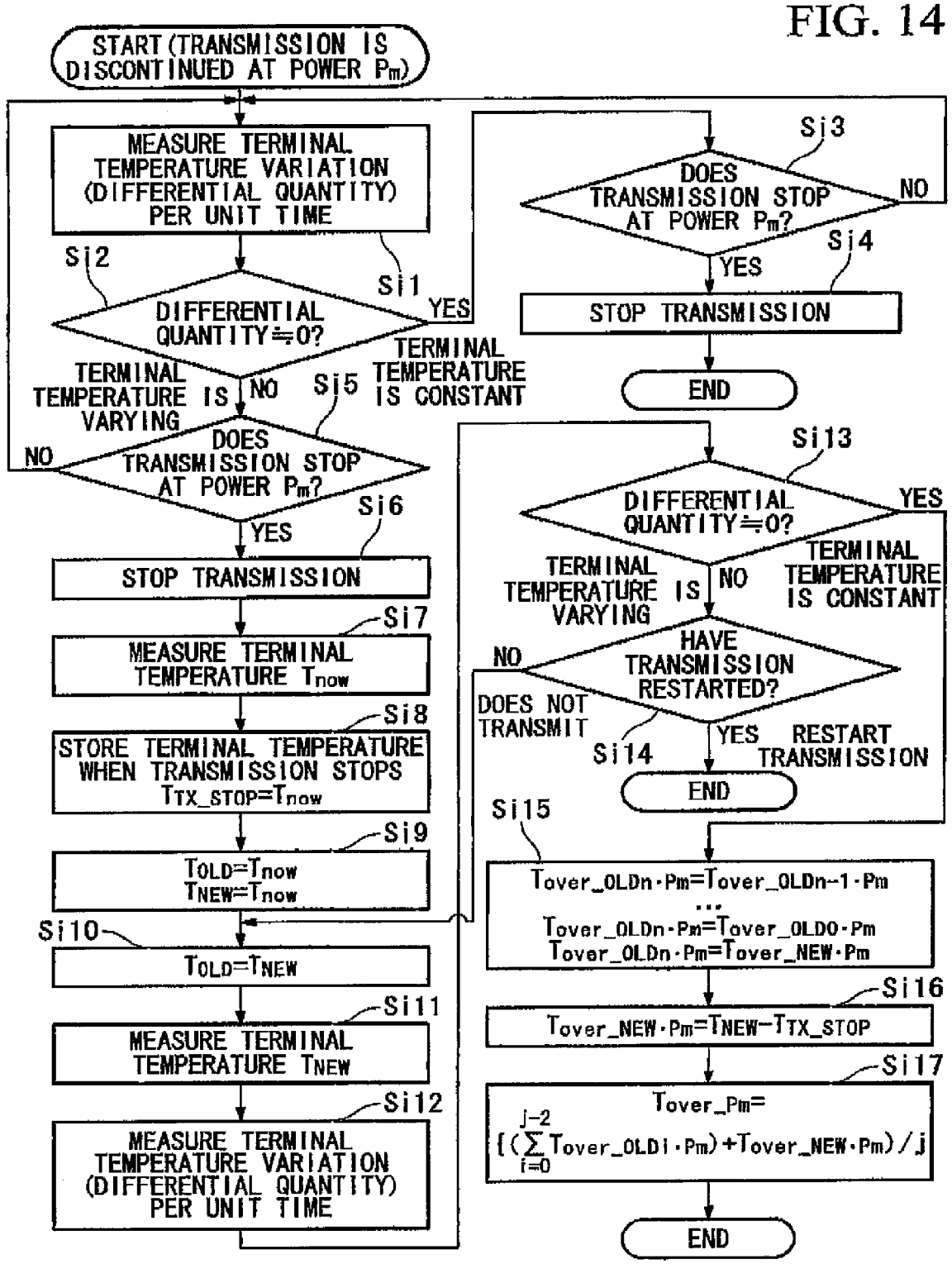
FIG. 14 is a flow chart illustrating processes for updating the temperature increasing value $T_{Over}$ based on the historical variation of the terminal temperature in accordance with the first embodiment of the present invention.

FIG. 14 is a flow chart illustrating processes for updating the temperature increasing value $T_{Over}$ based on the historical variation of the terminal temperature.

In Step Si1 the control unit 16 continuously measures terminal temperatures while transmitting data at the power Pm, wherein the terminal temperatures were detected by the temperature detecting unit 21 and the detected terminal temperatures have been converted to digital signals by the AD converter 20. The control unit 16 calculates differential quantities based on the terminal temperatures that have been detected continuously. The control unit 16 sets the calculated differential quantities to be temperature variations per unit time.

In Step Si2, the control unit 16 determines whether or not the detected differential quantities of the terminal temperatures are zero or almost zero. Namely, the control unit 16 determines whether or not the terminal temperature remains constant or almost constant over time. For example, a slow temperature increasing rate of not more than 1° C. for 10 minutes can be considered to be "almost constant" or that the detected differential quantity of the terminal temperature is almost zero.

In Step Si3, if the control unit 16 determines that the differential quantity is just or almost equal to zero, the control unit 16 recognizes that the terminal temperature has been constant. The control unit 16 determines whether or not the current time reaches the timing of discontinuing the transmission at the power Pm. The determination is made based on the schedule information supplied by the scheduling unit 13.

In Step Si4, if the control unit 16 determines that the current time has not yet reached the timing of discontinuing the transmission at the power Pm, the control unit 16 continuously measures terminal temperatures while transmitting data at the power Pm in Step Si1 until the increase of the terminal temperature is changed to the decrease due to the discontinuation of the transmission. If the control unit 16 determines that the current time has reached the timing of discontinuing the transmission at the power Pm, the control unit 16 renders the transmission control unit 14 discontinue the transmission. The control unit 16 terminates the control operations.

In Step Si5, if the control unit 16 determines, in Step Si2, that the differential quantity is not almost equal to zero, the control unit 16 recognizes that the terminal temperature is being changed. The control unit 16 determines whether or not the current time reaches the timing of discontinuing the transmission at the power Pm. The determination is made based on the schedule information supplied by the scheduling unit 13. If the control unit 16 determines that the current time has not yet reached the timing of discontinuing the transmission at the power Pm, the control unit 16 continuously measures terminal temperatures while transmitting data at the power Pm in Step Si1 until the increase of the terminal temperature is changed to the decrease due to the discontinuation of the transmission.

In Step Si6, if the control unit 16 determines that he current time has reached the timing of discontinuing the transmission at the power Pm, the control unit 16 renders the transmission control unit 14 discontinue the transmission, In Step Si7. after the transmission has been discontinued, then the control unit 16 detects the terminal temperature $T_{now}$ as a digital signal, wherein the terminal temperature was measured by the temperature detecting unit 21 and the measured terminal temperature has been converted into the digital signal that represents the terminal temperature $T_{now}$ by the AD converter 20.

In Step Si8, the control unit 16 sets the terminal temperature $T_{now}$ as a transmission discontinuing time terminal temperature $T_{TX\_STOP}$ that represents a terminal temperature when the transmission is discontinued. The control unit 16 stores the transmission discontinuing time terminal temperature $T_{TX\_STOP}$ in the memory unit 30.

In Step Si9, the control unit 16 stores the terminal temperature $T_{now}$ in the memory unit 30 in order to initialize parameters $T_{OLD}$ and $T_{NEW}$, wherein the memory unit 30 preserves areas for the parameters $T_{OLD}$ and $T_{NEW}$.

In Step Si10, the control unit 16 stores the parameter $T_{NEW}$ in the area of the parameter $T_{OLD}$.

In Step Si11, the control unit 16 continuously detects the terminal temperature $T_{NEW}$ as a digital signal, wherein the terminal temperature was detected by the temperature detecting unit 21 and then the detected terminal temperature has been converted into a digital signal that represents the terminal temperature $T_{NEW}$ by the AD converter 20.

In Step Si12, the control unit 16 calculates a differential quantity based on the terminal temperatures $T_{NEW}$ that have been detected continuously. The control unit 16 sets the calculated differential quantity to be a variation of the terminal temperature per unit time.

In Step Si13, the control unit 16 determines whether or not the calculated differential quantity is just or almost equal to zero. For example, a slow temperature increasing rate of not more than 1° C. for 10 minutes can be considered to be "almost constant" or that the measured time-differential quantity of the terminal temperature is almost zero.

In Step Si14, if the control unit 16 determines that the differential quantity is not almost equal to zero, then the control unit 16 determines that the terminal temperature is varying. The control unit 16 determines whether or not the transmission has restarted. The determination is made based on the schedule information that has been supplied by the scheduling unit 13. If the control unit 16 determines that the transmission has not yet restarted, then the control unit 16 stores a different new parameter $T_{NEW}$ in the area of the parameter $T_{OLD}$ in Step Si10 and detects the teal temperature $T_{NEW}$ as the digital signal in Step Si10.

In Step Si15, if the control unit 16 determines that the calculated differential quantity is just or almost equal to zero in Step Si13, then the control unit 16 updates a temperature increase value $T_{Over\_OLD}$ in accordance with the following equations (4). The temperature increase value $T_{Over\_OLD}$ is a value of temperature increase that is caused when the transmission is discontinued at the transmission power Pm and at an almost constant temperature.

$$T_{over\_OLD} \cdot Pm = T_{over\_OLDn-1} \cdot Pm \\ \vdots \\ T_{over\_OLD} \cdot Pm = T_{over\_OLD0} \cdot Pm \\ T_{over\_OLD} \cdot Pm = T_{over\_NEW} \cdot Pm \quad (4)$$

In Step Si16, the control unit 16 calculates a temperature increase value $T_{Over\_NEW \cdot Pm}$ at this time in accordance with the following equations (5).

$$T_{over\_NEW \cdot Pm} = T_{NEW} - T_{TX\_STOP} \quad (5)$$

In Step Si17, the control unit 16 calculates the average of the optional number (j) of the last temperature increase values $T_{Over}$ when the transmission is discontinued at the transmission power Pm and at almost constant temperature The calculation is made based on the following equations (6). The control unit 16 sets the calculated value to be the temperature increase value $T_{Over\_Pm}$ that is used in the process shown in FIG. 3.

$$T_{over} \cdot Pm = \left\{ \left( \sum_{i=0}^{j-2} T_{over\_OLDi \cdot Pm} \right) + T_{over\_NEW \cdot Pm} \right\} / j \quad (6)$$

In accordance with the transmission control process described above with reference to FIG. 3, the temperature increase value $T_{Over}$ is the predetermined value. In accordance with the process described with reference to FIG. 14, the temperature increase value $T_{Over}$ can be updated based on the temperature variation of the wireless communication terminal 1, thereby allowing a highly accurate control for the terminal temperature.

Figure 15:
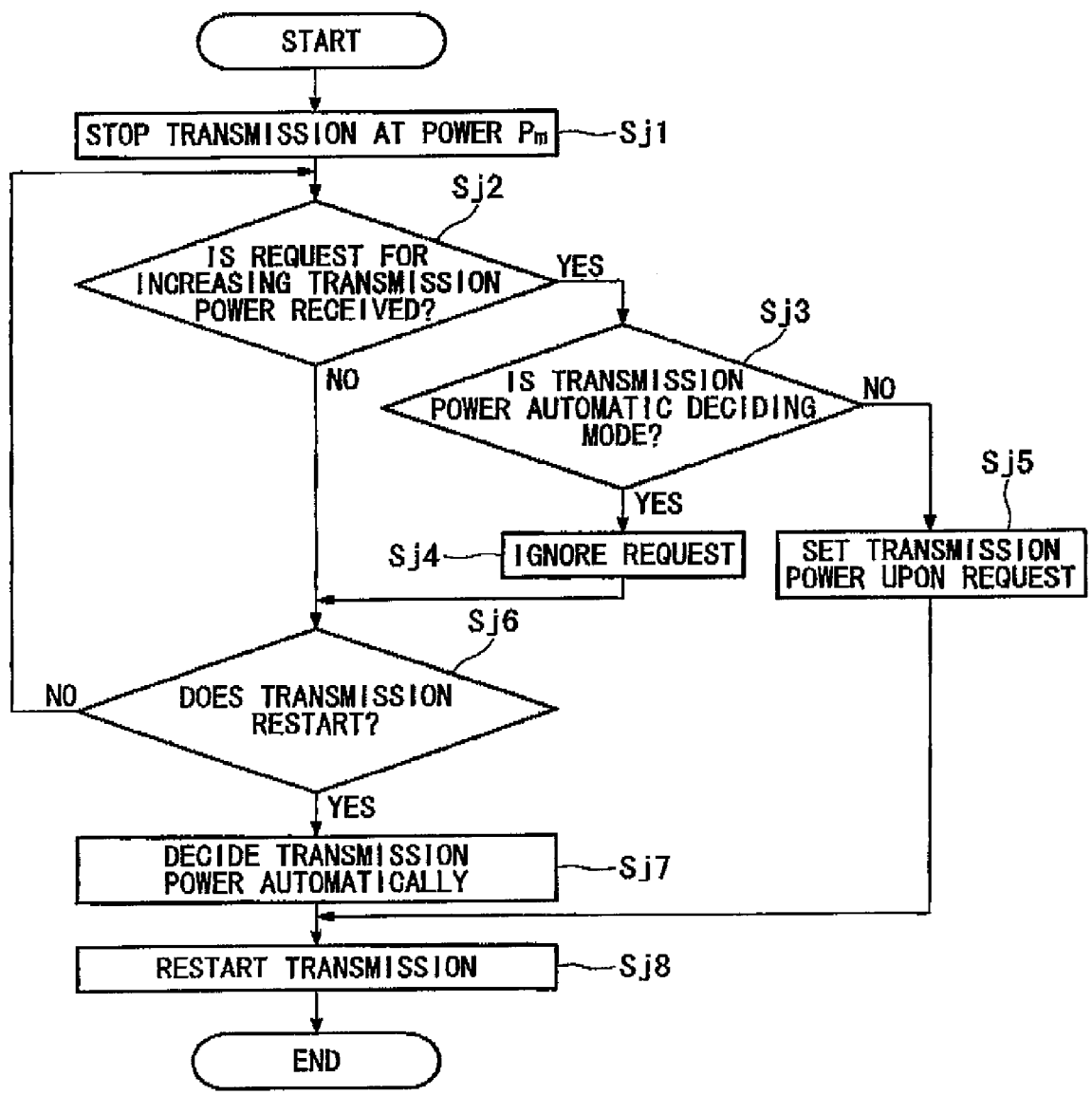
FIG. 15 is a flow chart illustrating processes for determining whether or not the transmission power is changed in accordance with a request for changing the transmission power which has been transmitted from the wireless base station in accordance with the first embodiment of the present invention.
Figure 16:
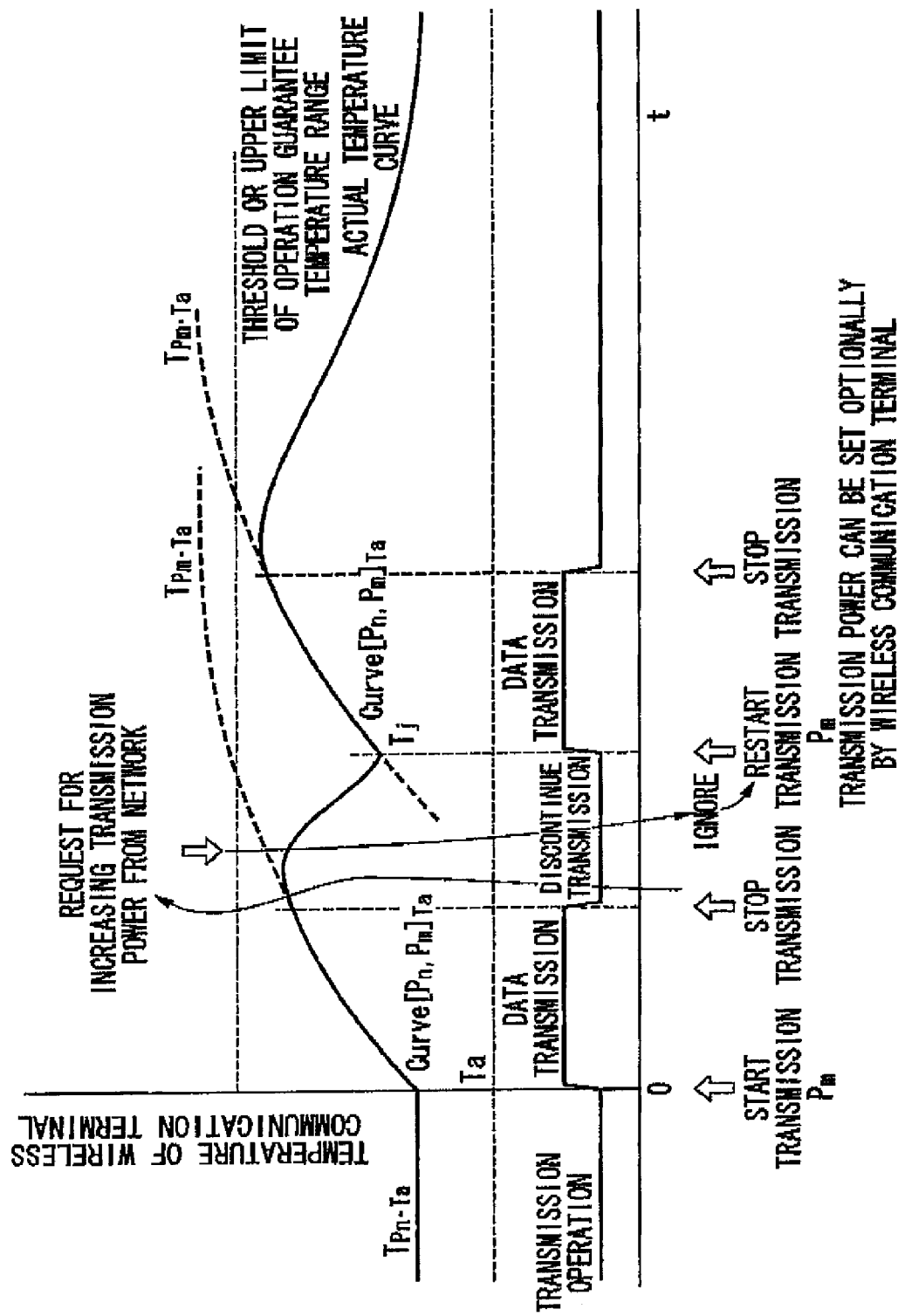
FIG. 16 is a diagram illustrating an actual terminal temperature variation over time when the transmission power remains unchanged even receiving the request for changing the transmission power which has been transmitted from the wireless base station in accordance with the first embodiment of the present invention.

FIG. 15 is a flow chart illustrating processes for determining whether or not the transmission power is changed in accordance with a request for changing the transmission power which has been transmitted from the wireless base station. FIG. 16 is a diagram illustrating an actual terminal temperature variation over time when the transmission power remains unchanged even receiving the request for changing the transmission power which has been transmitted from the wireless base station.

In Step Sj1, the transmission at the power Pm is discontinued by the transmission control unit 14.

In Step Sj2, after the transmission has been discontinued, then the wireless base station transmits, to the wireless communication terminal 1, a transmission power changing request that includes instructions to increase the transmission power, in order to ensure the establishment of the communication. The receiving unit 29 receives the transmission power changing request from the wireless base station. The demodulating unit 24 receives the transmission power changing request from the receiving unit 29. The demodulating unit 24 demodulates the transmission power changing request. The demodulating unit 24 supplies the demodulated transmission power changing request to the control unit 16.

In Step Sj6, the control unit 16 determines whether or not the instructions included in the transmission power chin request are instructions to increase the transmission power. If the control unit 16 determines that the instructions included in the transmission power changing request are not the instructions to increase the transmission power, then the control unit 16 refers the schedule information that has been supplied by the scheduling unit 13. The control unit 16 determines whether or not the current time has not yet reached the timing of restarting the transmission, the control unit 16 determines whether or not the instructions included in the transmission power changing request are instructions to increase the transmission power in Step Sj2.

In Step Si7, if the control unit 16 determines that the current time has reached the timing of restarting the transmission the control unit 16 automatically sets the transmission power Pm that is the same as the transmission power that had been used before the transmission was discontinued.

In Step Sj8, the control unit 16 renders the transmission control unit 17 restart the transmission in accordance with the schedule information.

In Step Sj3, if the control unit 16 determines that the instructions included in the transmission power changing request are the instructions to increase the transmission power, then the control unit 16 refers a flag that has previously been set in an internal storage area, wherein the flag represents whether or not a transmission power automatic deciding mode is set. With reference to the flag, the control unit 16 determines whether or not the transmission power automatic deciding mode has been set.

In Step Sj4, if the control unit 16 determines that the transmission power automatic deciding mode has been set, then the control unit 16 disregards transmission power changing request that has been received from the wireless base station. Namely, the control unit 16 does not refer the instructions to increase the transmission power, wherein the instructions are included in the transmission power changing request. The control unit 16 determines whether or not the instructions included in the transmission power changing request are instructions to increase the transmission power in Step Sj6.

In Step Sj5, if the control unit 16 determines that the transmission power automatic deciding mode has not yet been set, then the control unit 16 adds a predetermined value to the transmission power Pm in accordance with the instructions that are included in the transmission power changing request that has been received from the wireless base station. The control unit 16 supplies the changed transmission power to the transmission control unit 14. The control unit 16 renders the transmission control unit 17 restart the transmission in accordance with the schedule information in Step Sj8.

The control unit 16 can be configured to transmit data in accordance with the schedule information that has been prepared by the scheduling unit 13 as shown in FIG. 16, while the control unit 16 disregarding the instructions to increase the transmission power, the instructions being supplied from the wireless base station. This process improves the stability of the terminal temperature.

If the control unit 16 disregards the instructions to increase the transmission power from the wireless base station, his means that the control unit 16 violates the CDMA 1xEV-DO communication system and the CDMA 1x communication system. Notwithstanding, disregarding the instructions to increase the transmission power does not provide any substantive influence to the traffic of other wireless communication terminal that is accessible to the same wireless base station.

In accordance with the above-described first embodiment, significant programs do not detect or recognize that the transmission is being discontinued, while the transmission is discontinued. This allows untransmitted data to be overwritten and erased, the untransmitted data being stored in the data buffer 17. In order to avoid the untransmitted data to be erased, a lower layer, for example, the control unit 16 or the transmission control unit 14 that controls the transmission can notify the significant program that the transmission is being discontinued, and also can notify that the significant program that the transmission restarts.

The schedule information prepared by the scheduling unit 13 can also be notified to the significant programs.

Second Embodiment

In accordance with the above-described first embodiment, the transmission start and discontinuation are repeated for transmitting divided frames of data so as to maintain the terminal temperature below the upper limit of the operation guarantee temperature range.

In accordance with the second embodiment, a transmission of data traffic only is discontinued instead of discontinuing the transmission, while a transmission of control traffic is continued to ensure the establishment of communication between the wireless base station and the wireless communication terminal.

Figure 17:
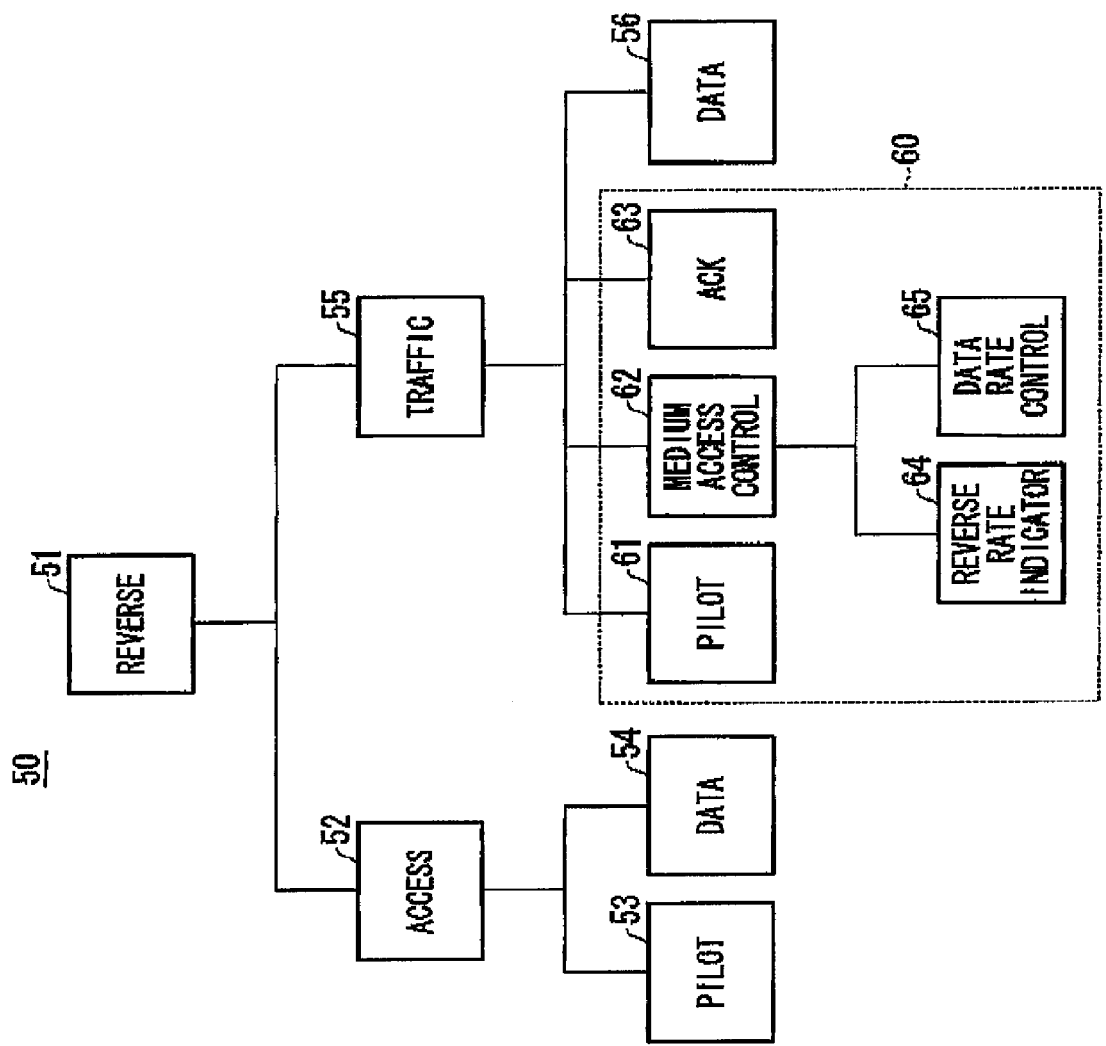
FIG. 17 is a block diagram illustrating a data traffic structure in the CDMA 1xEV-DO communication system in accordance with a second embodiment of the present invention.

FIG. 17 is a block diagram illustrating a data traffic structure in the CDMA 1xEV-DO communication system. The data traffic is of a Data 56. Thus, only the transmission of the Data 56 is discontinued, while continuing the transmissions of a control traffic 60 that includes Pilot 61, Medium Access Control 62, Ack 63, Reverse Rate Inductor 64, and Data Rate Control 65. If the transmission of Pilot 61 is continued, the wireless base station determines that the establishment of the communication with the wireless communication terminal is ensured. Thus, the wireless base station does not transmit the transmission power changing request that includes instructions to increase the transmission power that has been described in accordance with the first embodiment.

Figure 18:
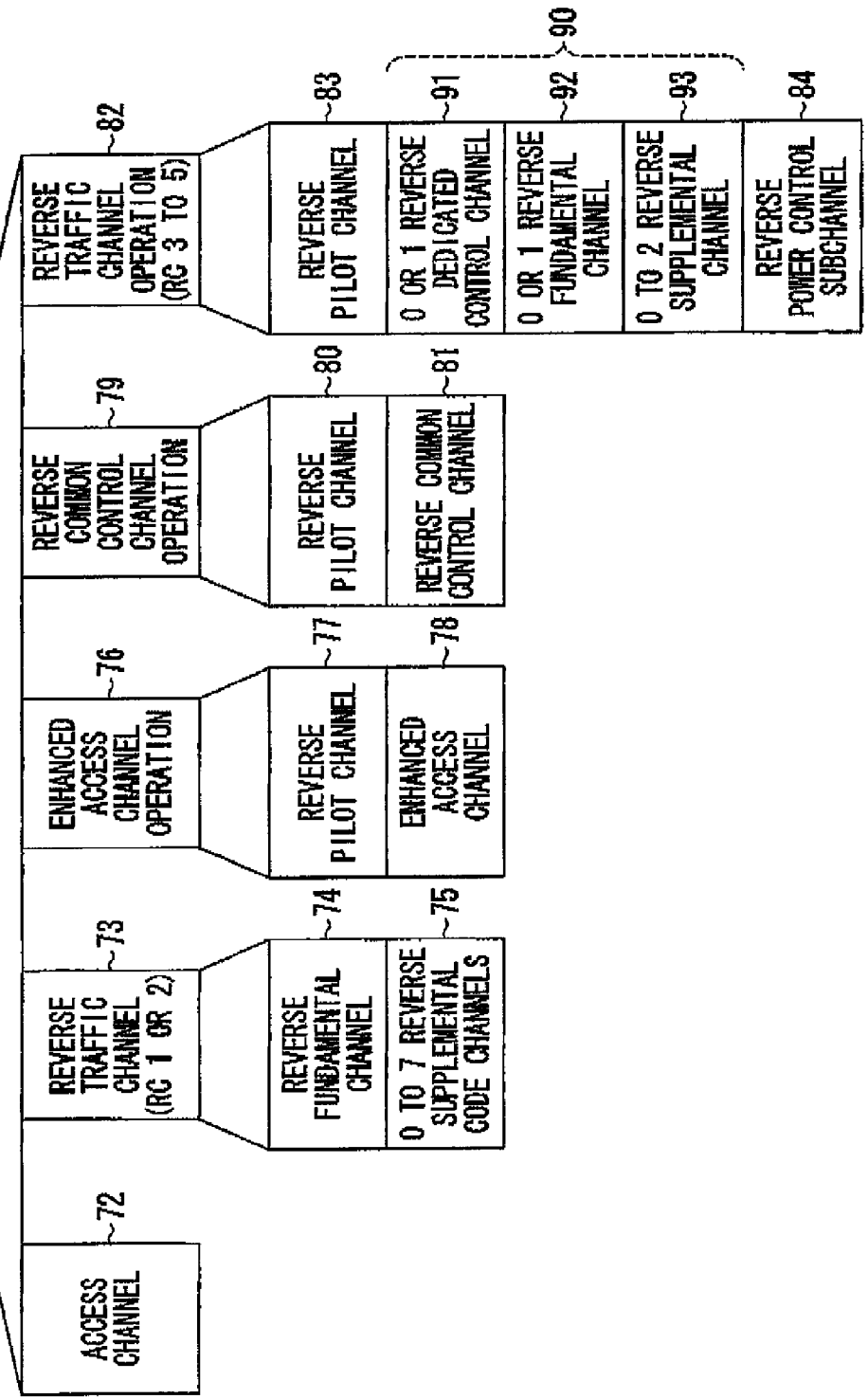
FIG. 18 is a diagram illustrating a data traffic structure in CDMA 1x communication system in accordance with the second embodiment of the present invention.

FIG. 18 is a diagram illustrating a data traffic structure in CDMA 1x communication system. In accordance with the CDMA 1x communication system, traffics 90 (91, 92, 93) are not witted, while continuing transmissions of Reverse Pilot Channel 83 and Reverse Power Control Subchannel 84 only, so as to ensue the establishment of the communication with the wireless base station while reducing the transmission power.

Figure 19:
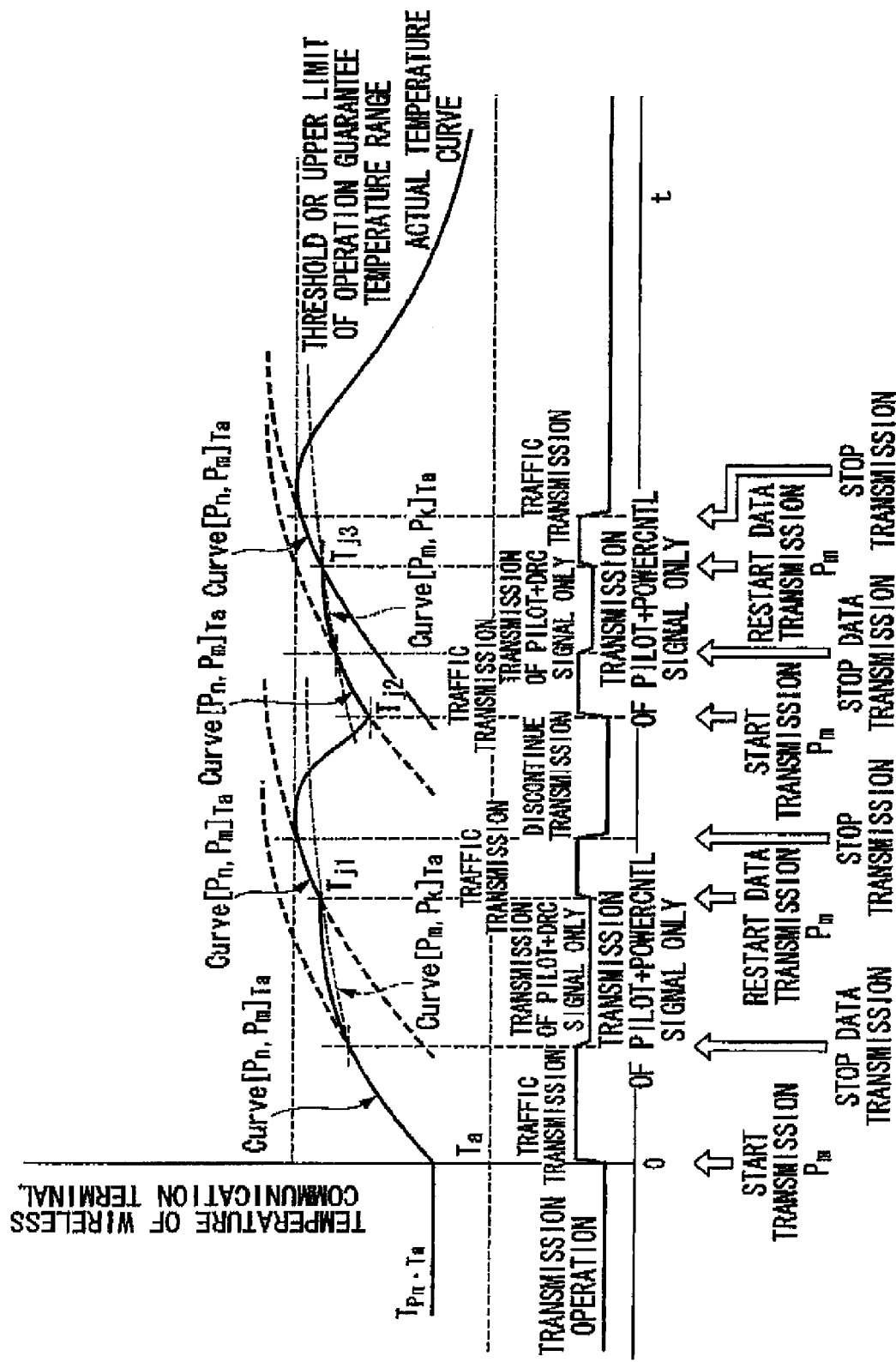
FIG. 19 is a diagram illustrating variation in terminal temperature over time when the transmission of data traffic is discontinued instead of discounting the transmission, while continuing the control traffics in accordance with the second embodiment of the present invention.

FIG. 19 is a diagram illustrating variation in terminal temperature over time when the transmission of data traffic is discontinued instead of discounting the transmission of data, while continuing the control traffics. As shown in this drawing, the transmission of data is not discontinued. If a state of the transmissions of all of the traffics is changed to another state of the transmission of the control traffic only, then the terminal temperature remains increasing. The state of the transmission of the control traffic only reduces the transmission power with reducing the gradient of the temperature increase, thereby suppressing heat generation. This ensures a long time until the terminal temperature reaches to the upper limit of the operation guarantee temperature range, thereby increasing the efficiency of the transmission.

Third Embodiment

In accordance with the second embodiment, the data traffic is not transmitted to reduce the mission power. In accordance with CDMA 1xEV-DO communication system, the transmission rate is changeable. In accordance with the third embodiment, the wireless communication terminal is configured to reduce the transmission rate, FIG. 20 is a diagram illustrating interrelationships between transmission rates and transmission powers in accordance with CDMA 1xEV-DO communication system. Reducing the data rate (Data Rate) reduces the gain of the transmission power. "DataOffsetNorm", "DataOffset9k6", "DataOffset76k8", and "DataOffset153k6" are the values that are transmitted from the wireless base station.

Figure 21:
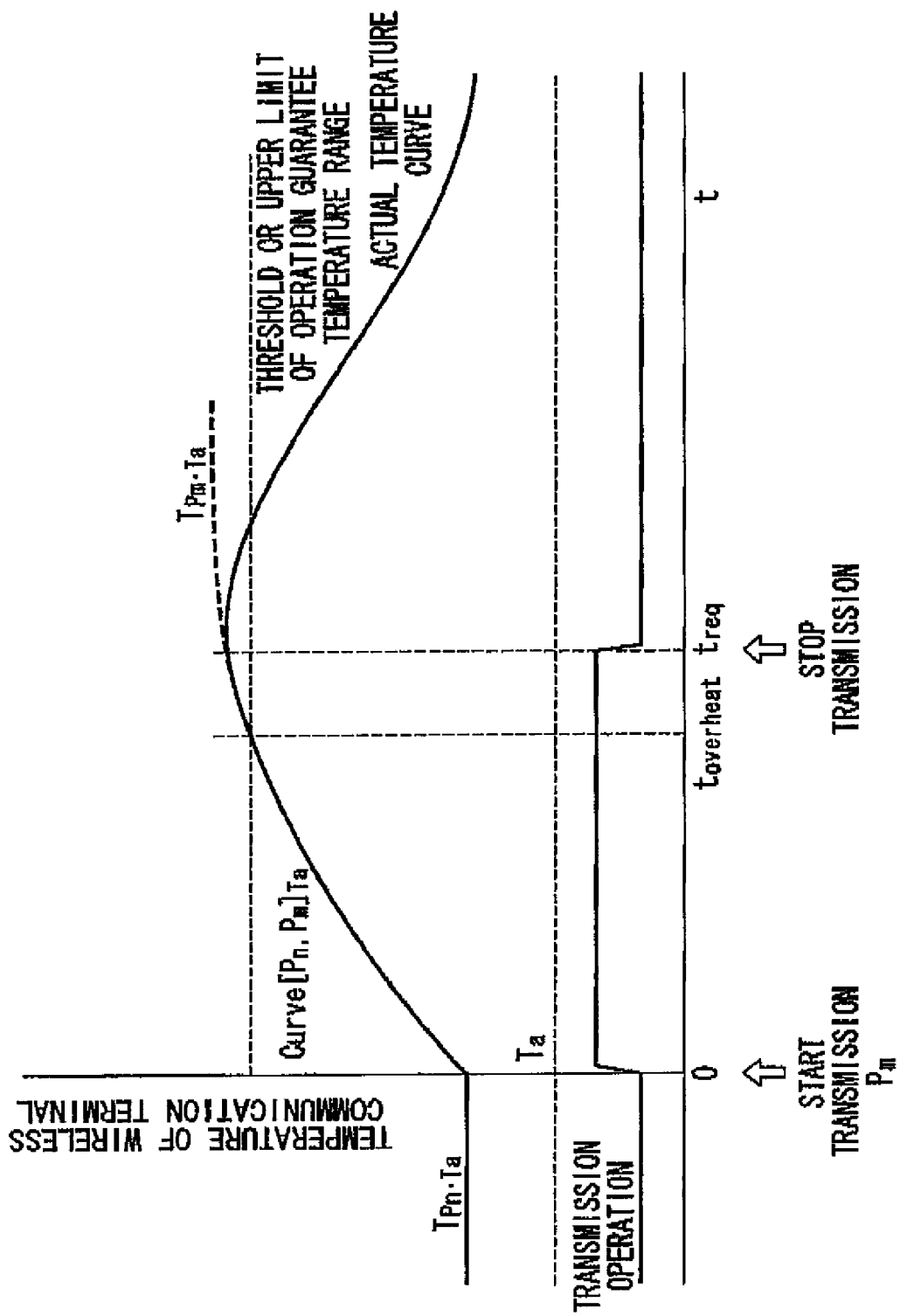
FIG. 21 is a diagram illustrating variations in terminal temperature over time when the transmission is performed without reducing the transmission rate in accordance with the third embodiment of the present invention.
Figure 22:
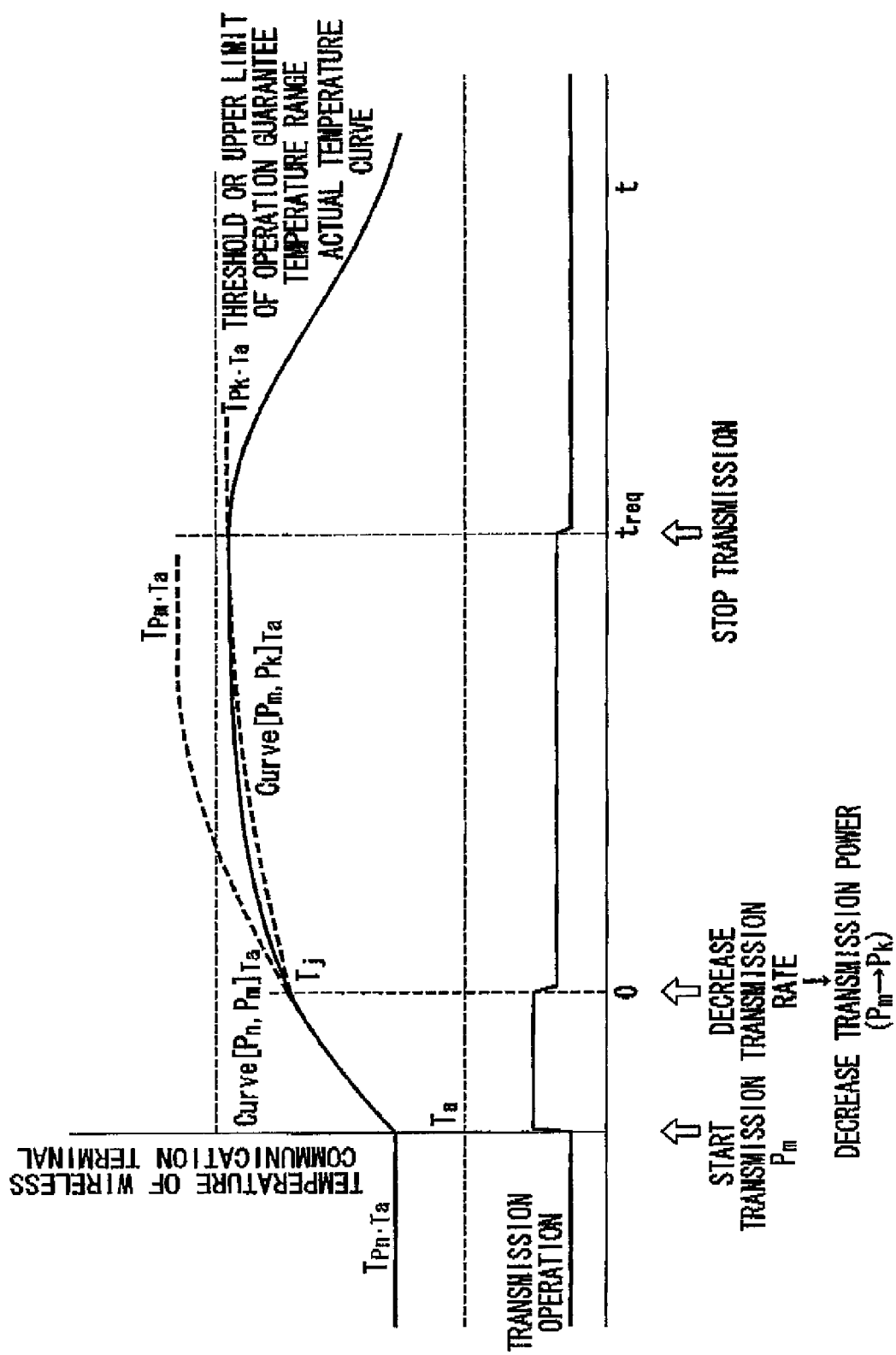
FIG. 22 is a diagram illustrating variations in terminal temperature over time when the transmission is performed with reducing the transmission rate in accordance with the third embodiment of the present invention.
Figure 23:
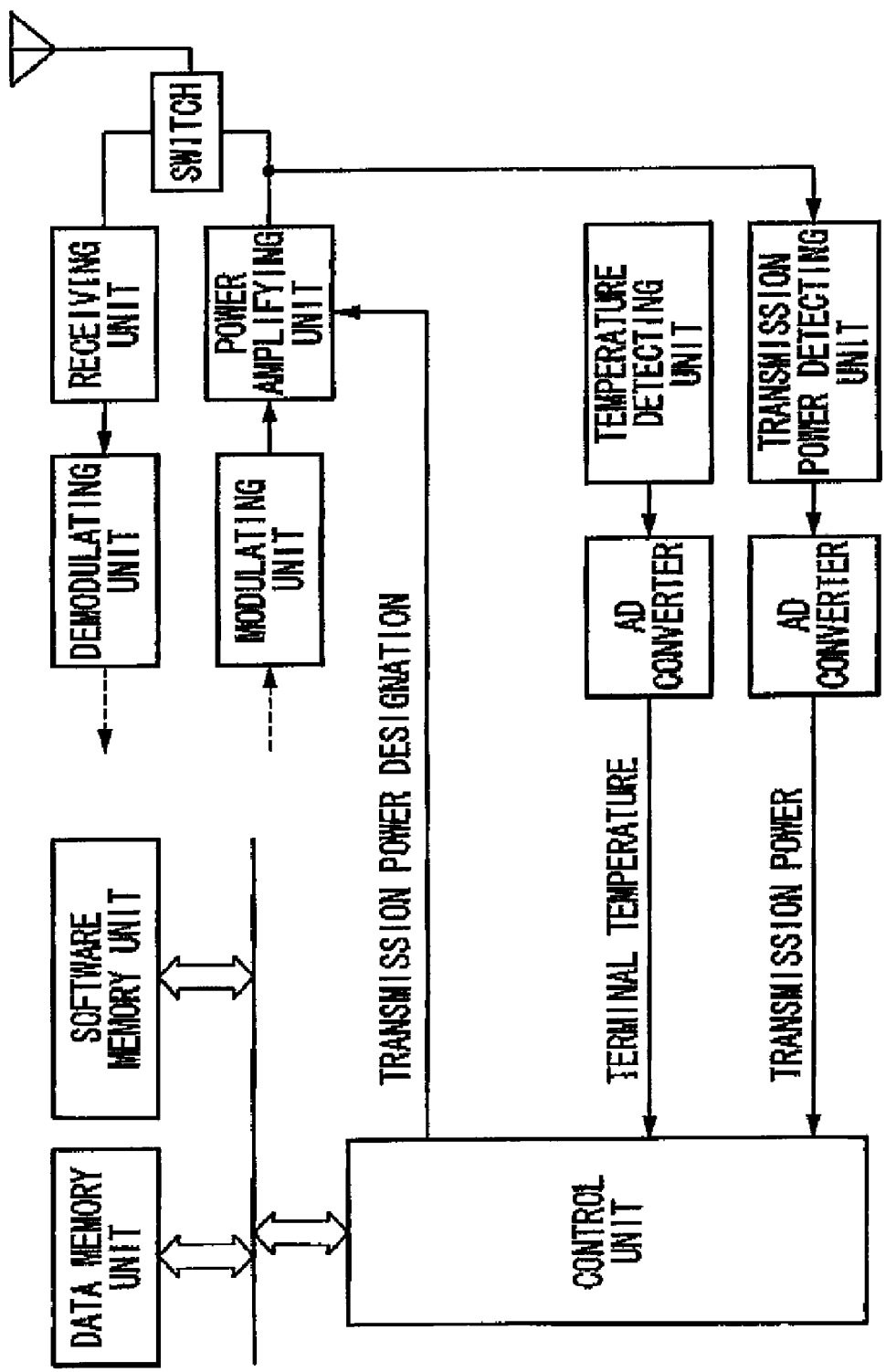
FIG. 23 is a block diagram illustrating a typical example of the conventional internal configuration of the wireless communication terminal.
Figure 24:
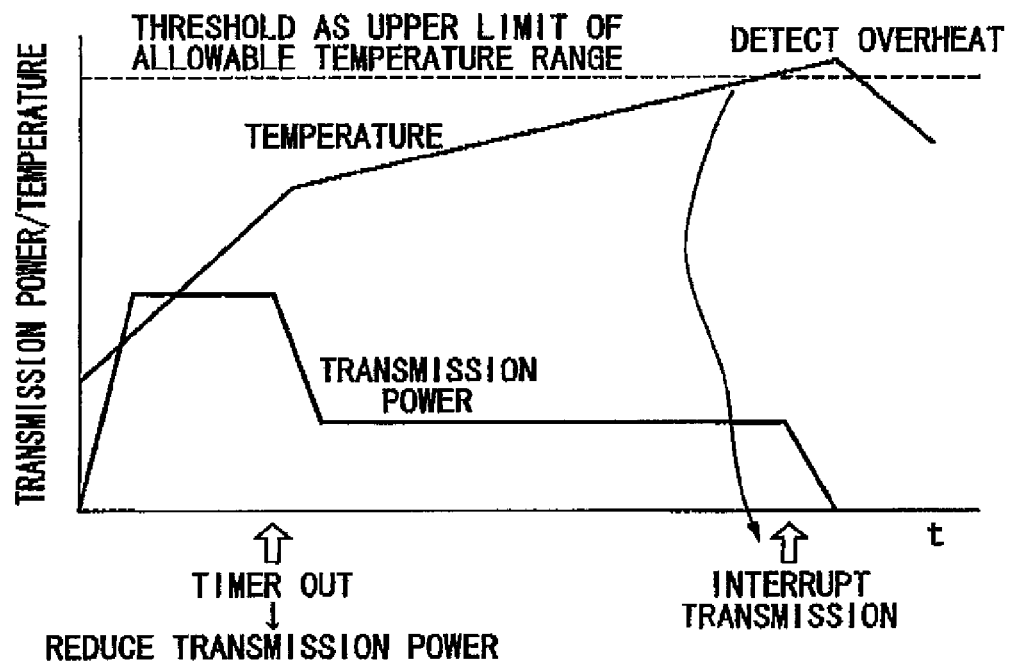
FIG. 24 is a diagram illustrating examples of variations of temperature and transmission power of the conventional wireless communication terminal.
Figure 25:
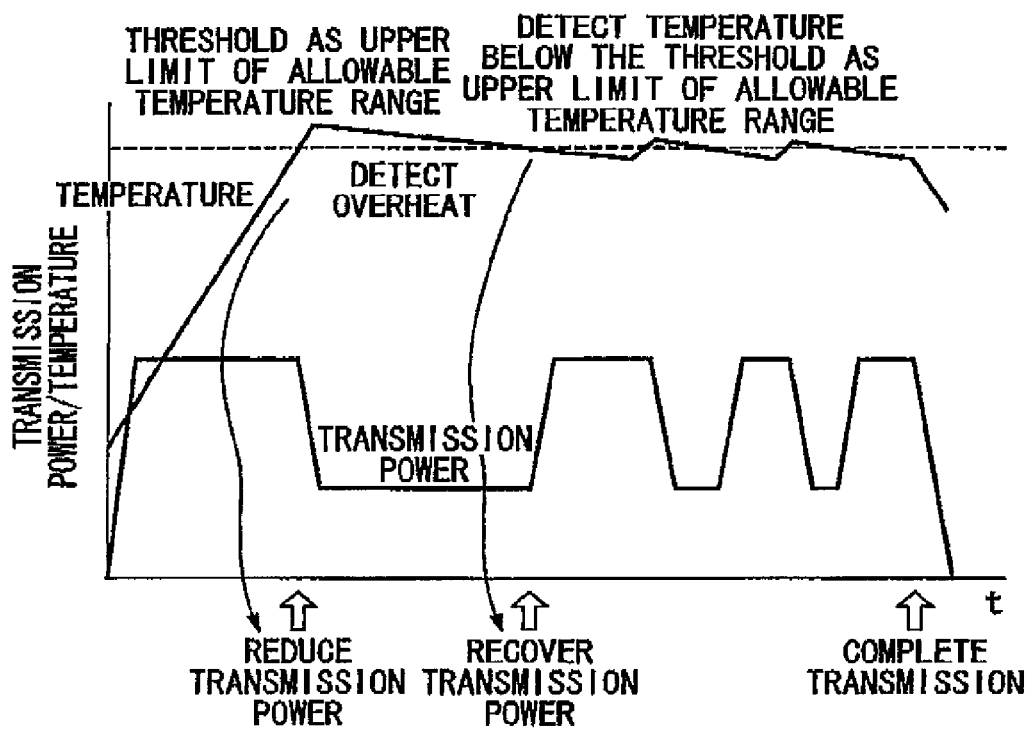
FIG. 25 is a diagram illustrating examples of variations of temperature and transmission power of the conventional wireless communication terminal.
Figure 26:
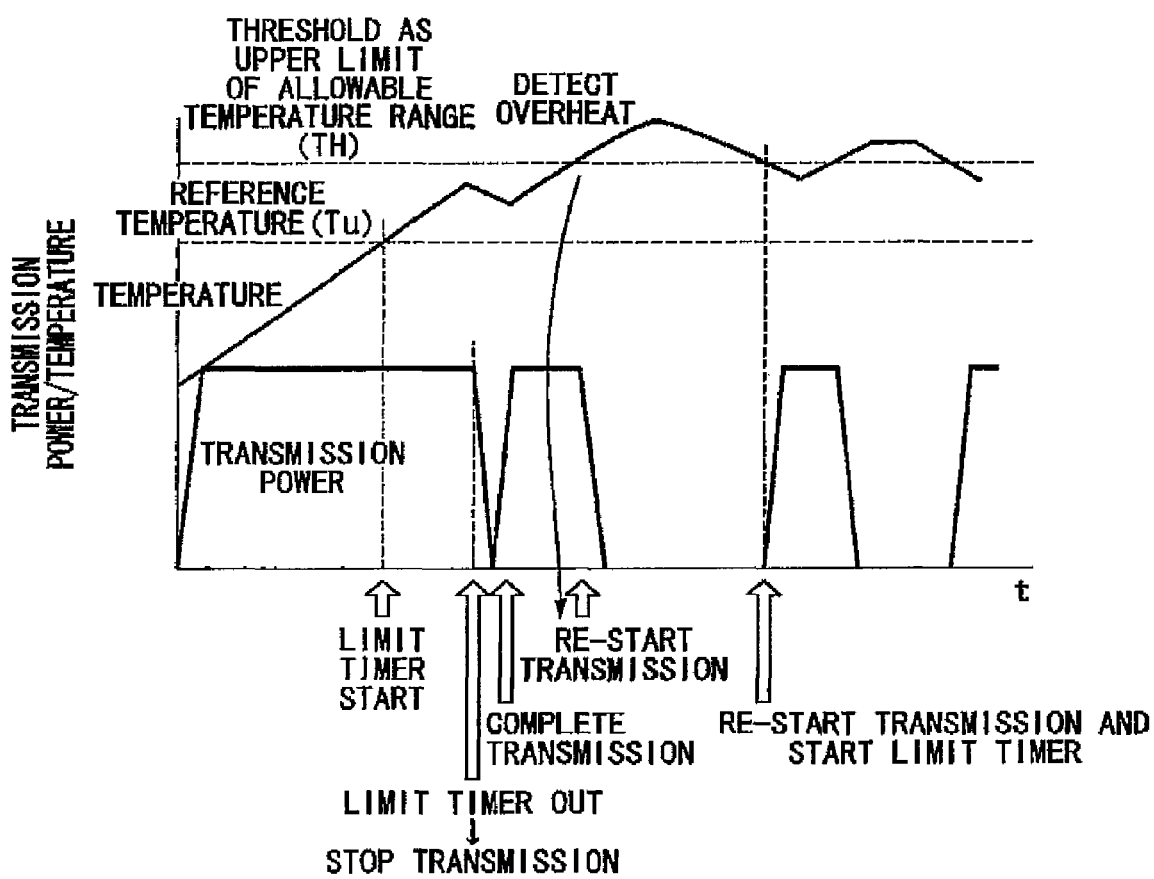
FIG. 26 is a diagram illustrating examples of variations of temperature and transmission power of the conventional wireless communication terminal.
Figure 27:
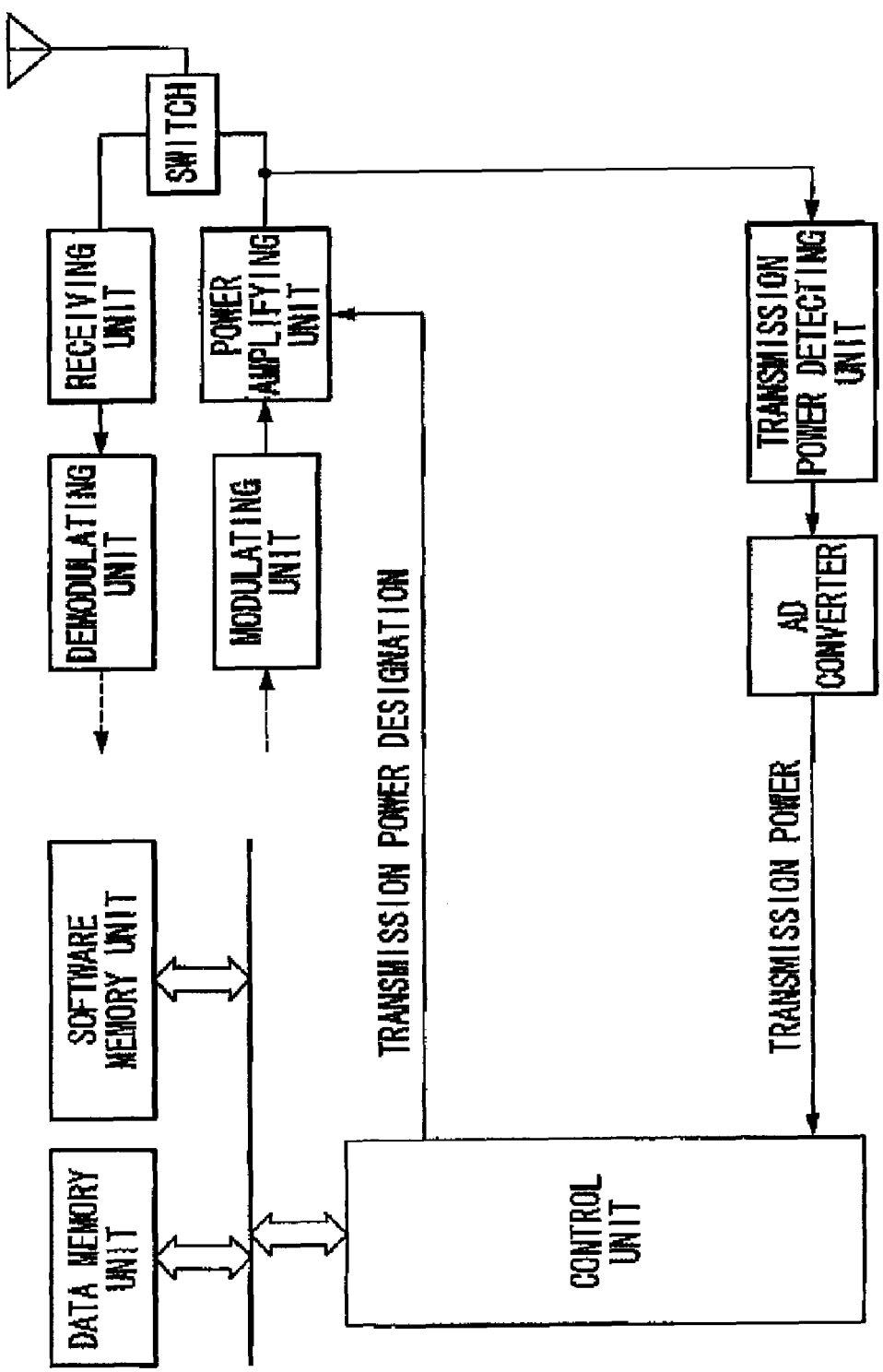
FIG. 27 is a block diagram illustrating a typical example of the conventional internal configuration of the wireless communication terminal.
Figure 28:
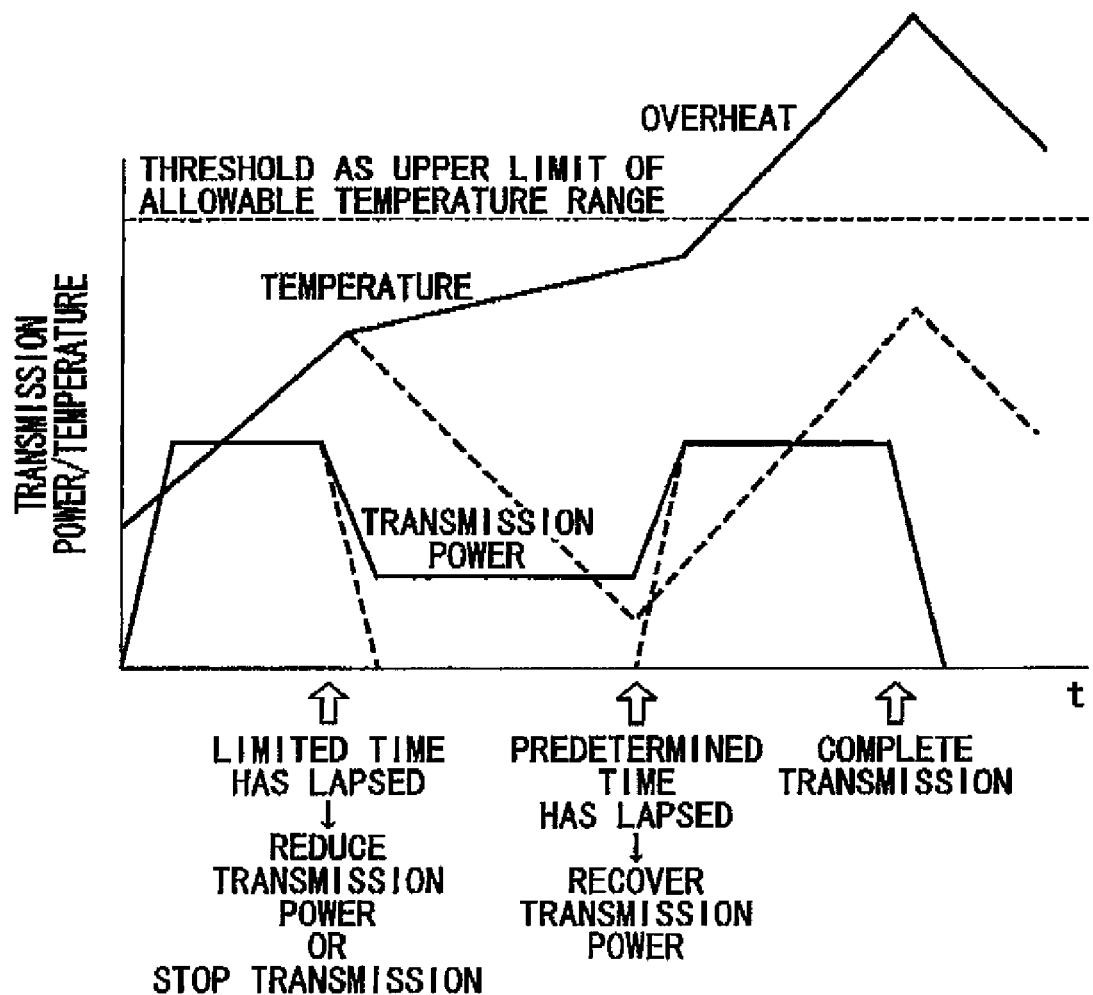
FIG. 28 is a diagram illustrating examples of variations of temperature and transmission power of the conventional wireless communication terminal.

FIG. 21 is a diagram illustrating variations in terminal temperature over time when the transmission is performed without reducing the transmission rate. FIG. 22 is a diagram illustrating variations in terminal temperature over time when the transmission is performed with reducing the transmission rate. As shown in FIG. 21, if the transmission rate is not reduced, the terminal temperature exceeds the upper limit of the operation guarantee temperature range before the transmission is discontinued. As shown in FIG. 22, if the transmission rate is reduced, the gradient of the temperature increase is reduced even the terminal temperature does not decrease differently from the case of discontinuing the transmission. Reducing the transmission rate allows the terminal temperature to be maintained within the operation guarantee temperature range until the transmission is terminated.

The function of reducing the transmission rate accords to the regulation of CDMA 1xEV-DO communication system. Even the transmission power is reduced the transmission power changing request including instructions to increase the transmission power is not transmitted from the wireless base station.

The above described wireless communication terminal integrates a computer system. The above described operations of the control unit 16, the transmission data quantity calculating unit 11, the transmission time calculating unit 12, the scheduling unit 13 and the transmission control unit 14 can be performed by executing programs by the computer. The programs can be stored in a computer-readable storage medium. Typical examples of the computer-readable storage medium may include, but are not limited to, magnetic disks, optomagnetic disks, CD-ROMs, DVD-ROMs, and semiconductor memories. It is also possible as a modification that the program can be distributed through a communication network to a computer so that this computer executes the received program.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "almost", "substantially," "about," an "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal comprising:
   a transmitting unit that transmits data to a wireless base station;
   a temperature detecting unit that detects a terminal temperature of the inside of the wireless communication terminal;
   a transmission power detecting unit that detects a transmission power;
   a memory unit that stores plural sets of terminal temperature variation information, each of the plural sets of terminal temperature variation information being related to a time-variation of the terminal temperature, the time-variation of the terminal temperature being defined with reference to an ambient temperature, the time-variation of the terminal temperature being caused by changing a first one of predetermined plural transmission powers to a second one thereof different from the first one; and
   a control unit that changes the transmission power based on a state of communication with the wireless base station,
   the control unit selecting and reading one of the plural sets of terminal temperature variation information from the memory unit, based on the ambient temperature, the transmission power detected by the transmission power detecting unit, and the second one of the predetermined plural transmission powers, and
   the control unit controlling the state of transmission of the data based on the selected one of the plural sets of terminal temperature variation information, so as to prevent the terminal temperature from increasing over an upper limit of a predetermined operation guarantee temperature range.

2. The wireless communication terminal according to claim 1, further comprising:
   a transmission data quantity calculating unit that calculates a capacity of the data;
   a transmission time calculating unit that calculates a transmission time based on the capacity of the data calculated by the transmission data quantity calculating unit, the transmission time being necessary for transmitting the data;
   a scheduling unit that prepares a set of schedule information that includes timings of at last one of sting and discontinuing the transmission of the data; and
   a transmission control unit that renders the transmitting unit transmit the data based on the set of schedule information prepared by the scheduling unit and the transmission power changed by the control unit;
   wherein the control unit calculates an operation guarantee time based on the read one of the plural sets of terminal temperature variation information, the operation guarantee time being a time until the terminal temperature reaches the upper limit of the predetermined operation guarantee temperature range,
   the scheduling unit compares the operation guarantee time calculated by the control unit with the transmission time calculated by the transmission time calculating unit,
   the scheduling unit divides the data into divided frames of data based on a constant data capacity if the transmission time calculated by the transmission time calculating unit is longer than the operation guarantee time calculated by the control unit, and
   the scheduling unit prepares a set of schedule information that includes timings of starting respective transmissions of the divided frames of data.

3. The wireless communication terminal according to claim 1, wherein the scheduling unit compares the operation guarantee time calculated by the control unit with the transmission time calculated by the transmission time calculating unit,
   the scheduling unit calculates, based on the read one of the plural sets of terminal temperature variation information, a terminal temperature when the transmission time calculated by the transmission time calculating unit has lapsed, if the transmission time calculated by the transmission time calculating unit is shorter than the operation guarantee time calculated by the control unit, and
   the scheduling unit divides the data into divided frames of data based on a constant data capacity and prepares a set of schedule information that includes timings of starting respective transmissions of the divided frames of data if a sum of the terminal temperature and an estimated temperature increase value, by which the terminal temperature will increase after the transmission is discontinued, exceeds the upper limit of the operation guarantee temperature range.

4. The wireless communication terminal according to claim 3, wherein the control unit calculates the estimated temperature increase value, based on the terminal temperature that varies depending on the events that the transmitting unit starts and discontinues the transmission,
   the scheduling unit calculates, based on the read one of the plural sets of terminal temperature variation information, a terminal temperature when the transmission time calculated by the transmission time calculating unit has lapsed, and
   the scheduling unit divides the data into divided frames of data based on a constant data capacity and prepares a set of schedule information that includes timings of stating respective transmissions of the divided frames of data, if a sum of the terminal temperature and the estimated temperature increase value calculated by the control unit exceeds the upper limit of the operation guarantee temperature range.

5. The wireless communication terminal according to claim 2, wherein the control unit includes an internal memory region that stores the terminal temperatures detected by the temperature detecting unit in the sequence of detection,
   the control unit determines whether or not a constant state of the terminal temperature is present, based on the terminal temperatures stored in the internal memory region, if the terminal temperature detected by the temperature detecting unit increases,
   the control unit selects and reads one of the plural sets of terminal temperature variation information from the memory unit, based on an ambient temperature calculated from the terminal temperature in the constant state, if the constant state of the terminal temperature is present,
   the control unit selects and reads one of the plural sets of terminal temperature variation information from the memory unit, based on a different ambient temperature calculated from the terminal temperature before the transmission starts, if the constant state of the terminal temperature is absent, the control unit calculates the operation guarantee time based on the read one of the plural sets of terminal temperature variation information.

6. The wireless communication terminal according to claim 2, wherein the scheduling unit sets the transmission discontinuing time to be one of a maximum time period in which no retransmission appears and a time until the terminal temperature decreases to a predetermined restart reference temperature, in order to prepare a set of schedule information that includes timings of starting respective transmissions of divided frames of data.

7. The wireless communication terminal according to claim 6, wherein if the transmission control unit receives an input of the set of schedule information that is prepared by setting the transmission discontinuing time to be the maximum time period in which no retransmission appears, then the transmission control unit renders a timer measure a lapsed time after the transmission control unit stops the transmission in accordance with the set of schedule information, and the transmission control unit renders the transmitting unit restart the transmission when the lapsed time reaches the maximum time period in which no retransmission appears.

8. The wireless communication terminal according to claim 6, wherein the restart reference temperature is a terminal temperature before the transmission starts.

9. The wireless communication terminal according to claim 8, wherein the control unit calculates the restart reference temperature so as to maximize a ratio of the transmitting time when the transmitting unit transmits the divided frames of data to the transmission discontinuing time when the transmitting unit discontinues the transmission, and the scheduling unit sets the transmission discontinuing time to be a time until the terminal temperature decreases to the restart reference temperature calculated by the control unit.

10. The wireless communication terminal according to claim 2, wherein the control unit calculates the terminal temperature based on a lapsed time after the transmission starts and the set of terminal temperature variation information, the control unit calculates a difference between the terminal temperature as calculated and the terminal temperature detected by the temperature detecting unit, the control unit renders the scheduling unit prepare the set of schedule information if the calculated difference is not almost zero.

11. The wireless communication terminal according to claim 2, wherein the control unit renders the transmission control unit continue the transmission of data based on a value of flag previously stored if the wireless base station transmits instructions to increase the transmission power while transmitting the data in accordance with the set of schedule information, the control unit renders the transmission control unit continue the transmission of data in accordance with the set of schedule information if the flag is not to refer the instructions to increase the transmission power.

12. The wireless communication terminal according to claim 2, wherein the transmission control unit discontinues a data traffic at the timing of discontinuing the transmission of data in accordance with the set of schedule information, if the traffic of the transmission of data includes the data traffic and a control traffic that maintains the communication with the wireless base station.

13. The wireless communication terminal according to claim 2, wherein the transmission control unit transmits the data while decreasing a transmission rate to a predetermined value at the timing of discontinuing the transmission of the data in accordance with the set of schedule information if a plurality of transmission rates of data exist.

14. A method of controlling a transmission by a wireless communication terminal, the method comprising:

detecting a terminal temperature of the inside of the wireless communication terminal;

detecting a transmission power;

storing plural sets of terminal temperature variation information in a memory unit, each of the plural sets of terminal temperature variation information being related to a time-variation of the terminal temperature, the time-variation of the terminal temperature being defined with reference to an ambient temperature, the time-variation of the terminal temperature being caused by changing a first one of predetermined plural transmission powers to a second one thereof different from the first one;

changing the transmission power based on a state of communication with a wireless base station;

selecting and reading one of the plural sets of terminal temperature variation information from the memory unit, based on the ambient temperature, and the second one of the predetermined plural transmission powers; and controlling the state of transmission of the data based on the selected one of the plural sets of terminal temperature variation information, so as to prevent the terminal temperature from increasing over an upper limit of a predetermined operation guarantee temperature range.

15. A computer program to be executed to cause a wireless communication terminal to perform a method of controlling a transmission, the method comprising:

detecting a terminal temperature of the inside of the wireless communication terminal;

detecting a transmission power;

storing plural sets of terminal temperature variation information in a memory unit, each of the plural sets of terminal temperature variation information being related to a time-variation of the terminal temperature, the time-variation of the terminal temperature being defined with reference to an ambient temperature, the time-variation of the terminal temperature being caused by changing a first one of predetermined plural transmission powers to a second one thereof different from the first one;

changing the transmission power based on a state of communication with a wireless base station;

selecting and reading one of the plural sets of terminal temperature variation information from the memory unit, based on the ambient temperature, and the second one of the predetermined plural transmission powers; and controlling the state of transmission of the data based on the selected one of the plural sets of terminal temperature variation information, so as to prevent the terminal temperature from increasing over an upper limit of a predetermined operation guarantee temperature range.

* * * * *